(12) United States Patent
Kada

(10) Patent No.: US 10,313,481 B2
(45) Date of Patent: Jun. 4, 2019

(54) INFORMATION PROCESSING METHOD AND SYSTEM FOR EXECUTING THE INFORMATION METHOD

(71) Applicant: COLOPL, Inc., Tokyo (JP)

(72) Inventor: Takeshi Kada, Chiba (JP)

(73) Assignee: COLOPL, INC., Tokyo (JP)

( * ) Notice: Subject to any disclaimer, the term of this patent is extended or adjusted under 35 U.S.C. 154(b) by 0 days.

(21) Appl. No.: 15/881,503

(22) Filed: Jan. 26, 2018

(65) Prior Publication Data

US 2018/0302499 A1 Oct. 18, 2018

(30) Foreign Application Priority Data

Jan. 27, 2017 (JP) .................................. 2017-013091

(51) Int. Cl.
*G06T 15/00* (2011.01)
*H04L 29/06* (2006.01)
(Continued)

(52) U.S. Cl.
CPC .............. *H04L 67/38* (2013.01); *A63F 13/00* (2013.01); *A63F 13/5258* (2014.09);
(Continued)

(58) Field of Classification Search
CPC . G06F 3/01; G06F 3/011; G06T 19/00; G06T 7/70; G06T 2207/30244;
(Continued)

(56) References Cited

U.S. PATENT DOCUMENTS 7,333,108 B2 * 2/2008 Takahashi ............... G06T 15/20
345/419
8,161,398 B2 * 4/2012 Cragun .................. G09B 21/00
715/706
(Continued)

FOREIGN PATENT DOCUMENTS

JP 2002-358542 A 12/2002
JP 2006-146338 A 6/2006
(Continued)

OTHER PUBLICATIONS

Streuber S, Chatziastros A. Human interaction in multi-user virtual reality. InProceedings of the International Conference on Humans and Computers Dec. 2007 (pp. 1-7).*
Chen, Weiya. "Collaboration in Multi-user Immersive Virtual Environment." PhD diss., Université Paris-Saclay, 2015.*
VRScout, "Social VR Demo—Selfie Stick and 360 Photo Spheres—Oculus", online, Apr. 13, 2016, searched Jan. 19, 2018, Internet, https://www.youtube.com/watch?v=pumFtAjgLY.
Notice of Allowance in JP Application No. 2017-013091, dated Nov. 21, 2017, 5pp.
(Continued)

*Primary Examiner* — Phu K Nguyen
(74) *Attorney, Agent, or Firm* — Hauptman Ham, LLP

(57) ABSTRACT

A method includes defining a virtual space, wherein the virtual space comprises a second avatar object and a first avatar of object, the first avatar object is associated with a first user, and the first user is associated with a first head-mounted device (HMD). The method further includes identifying a position of the first avatar object in the virtual space. The method further includes defining a visual field from the position in the virtual space. The method further includes generating a visual-field image corresponding to the visual field. The method further includes displaying the visual-field image on the first HMD. The method further (Continued)

includes identifying a relative positional relationship between the first avatar object and the second avatar object. The method further includes displaying an enlarged image of at least a part of the second avatar object in response to the relative positional relationship satisfying a predetermined condition.

12 Claims, 22 Drawing Sheets

(51) Int. Cl.
*G06F 3/01* (2006.01)
*G06T 19/00* (2011.01)
*G06T 15/10* (2011.01)
*A63F 13/00* (2014.01)
*A63F 13/5258* (2014.01)
*G02B 27/01* (2006.01)

(52) U.S. Cl.
CPC ........... *G02B 27/017* (2013.01); *G06F 3/013* (2013.01); *G06T 15/10* (2013.01); *G06T 19/00* (2013.01); *G02B 2027/014* (2013.01); *G02B 2027/0187* (2013.01); *G06F 2203/04806* (2013.01); *G06T 2219/2016* (2013.01)

(58) Field of Classification Search
CPC .......... G06T 2219/024; H04N 21/6156; H04N 21/6125; H04N 21/44008; H04N 21/4223; H04N 21/42203; H04N 21/6587
USPC ........................................................ 345/418
See application file for complete search history.

(56) References Cited

U.S. PATENT DOCUMENTS

| 9,213,405 | B2* | 12/2015 | Perez | ............... H04N 21/25891 |
| 9,897,805 | B2* | 2/2018 | Stafford | ............ G02B 27/0093 |
| 2006/0103646 | A1 | 5/2006 | Takahashi | |
| 2012/0299962 | A1* | 11/2012 | White | .................. G02B 27/017 |
| | | | | 345/633 |
| 2013/0141419 | A1* | 6/2013 | Mount | .................... G06F 3/011 |
| | | | | 345/419 |
| 2017/0150230 | A1 | 5/2017 | Shimura et al. | |

FOREIGN PATENT DOCUMENTS

| JP | 2013-175929 A | 9/2013 |
| WO | 2016/002445 A1 | 1/2016 |

OTHER PUBLICATIONS

\* cited by examiner

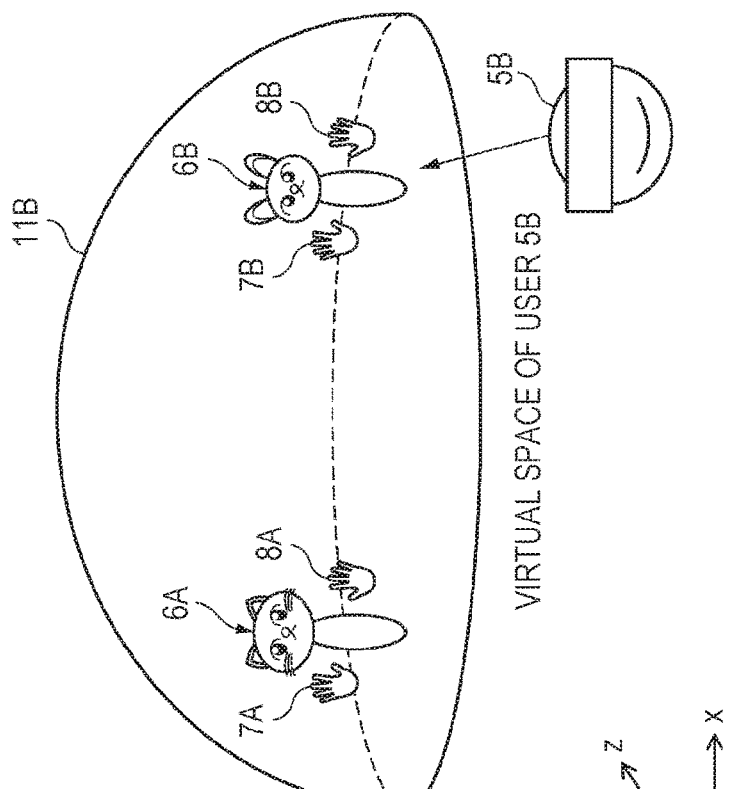
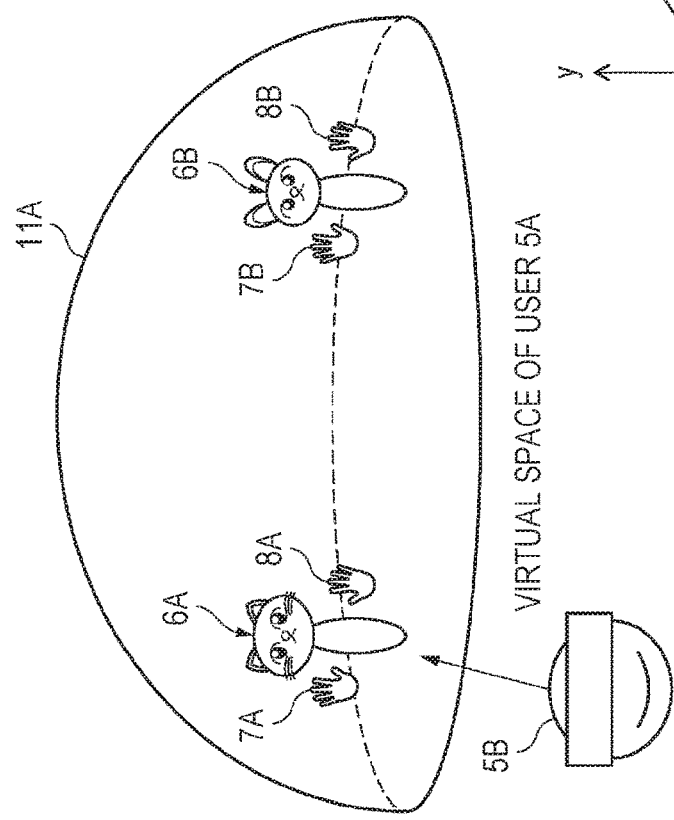

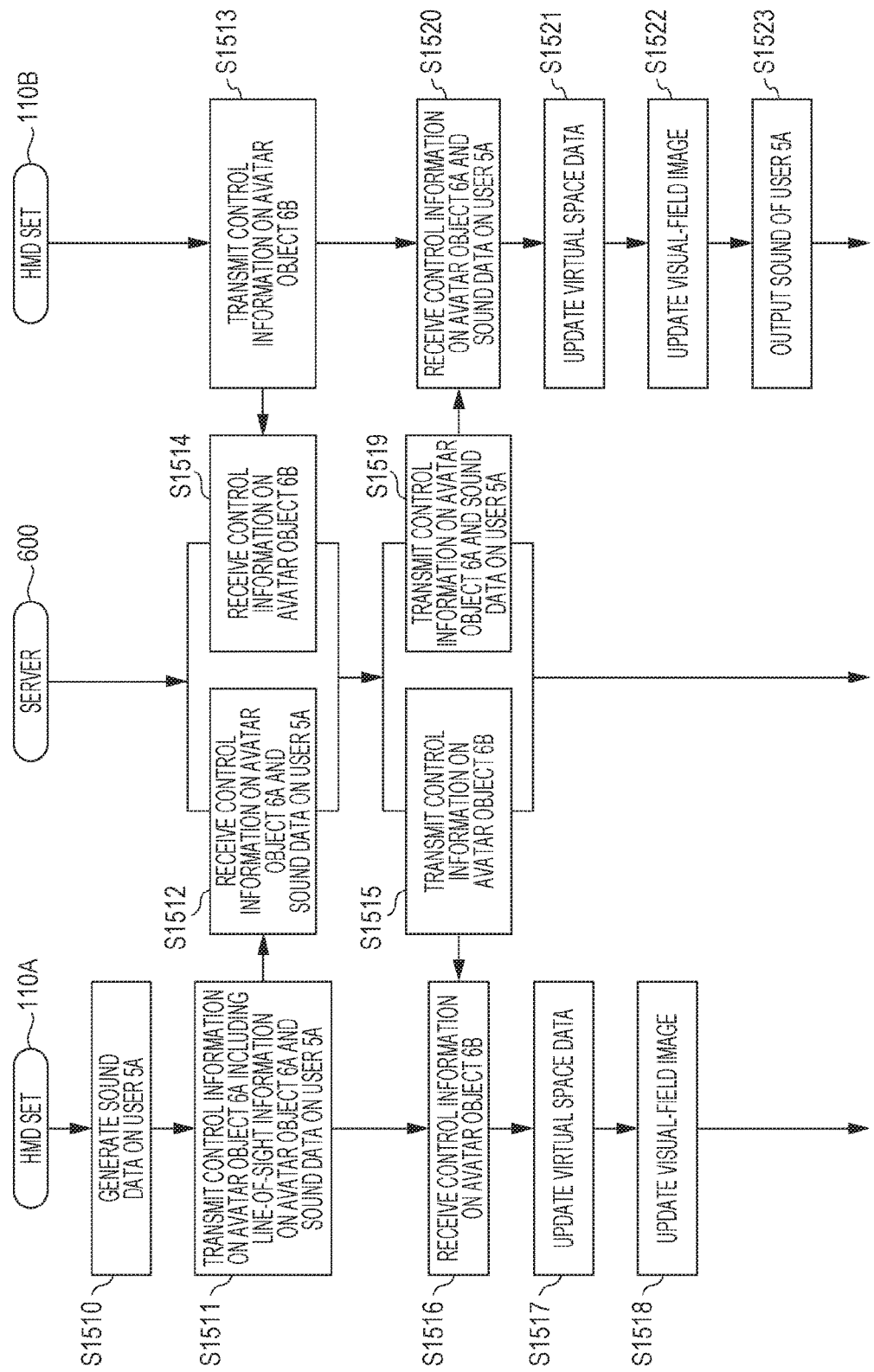

INFORMATION PROCESSING METHOD AND SYSTEM FOR EXECUTING THE INFORMATION METHOD

RELATED APPLICATIONS

The present application claims priority to Japanese Application No. 2017-013091, filed Jan. 27, 2017, the disclosure of which is hereby incorporated by reference herein in its entirety.

TECHNICAL FIELD

This disclosure relates to an information processing method and a system for executing the information processing method.

BACKGROUND

The sharing of a virtual space by a plurality of users wearing a head-mounted device (hereinafter simply referred to as "HMD") via a network is known. For example, in Non-Patent Document 1, there is proposed the sharing of a virtual reality (VR) space among a plurality of users to enjoy communication in which body language is used in the VR space through operation of a hand device.

PATENT DOCUMENTS

[Non-Patent Document 1] "Social VR Demo-Selfie Stick and 360 Photo Spheres-Oculus", [online], Apr. 13, 2016, VRScout, [retrieved on Dec. 26, 2016], Internet <https://www.youtube.com/watch?v=-pumFtAjgLY>

SUMMARY

There is provided a method including defining a virtual space, the virtual space including a second avatar and a first avatar associated with a first user, the first user being associated with a first head-mounted device (HMD). The method further includes identifying a position of the first avatar in the virtual space. The method further includes defining a visual field from the position in the virtual space. The method further includes generating a visual-field image corresponding to the visual field. The method further includes displaying the visual-field image on the HMD. The method further includes identifying a relative positional relationship between the first avatar and the second avatar. The method further includes enlarging at least a part of the second avatar in response to the relative positional relationship satisfying a predetermined condition.

BRIEF DESCRIPTION OF THE DRAWINGS

FIG. 14A A diagram of the virtual space provided to the user 5A according to at least one embodiment of this disclosure.

FIG. 14B A diagram of the virtual space provided to the user 5B according to at least one embodiment of this disclosure.

FIG. 15 A sequence diagram of an example of processing of synchronizing a motion by each avatar among the user terminals according to at least one embodiment of this disclosure.

DETAILED DESCRIPTION

Description of Embodiments of this Disclosure

Figure 1:
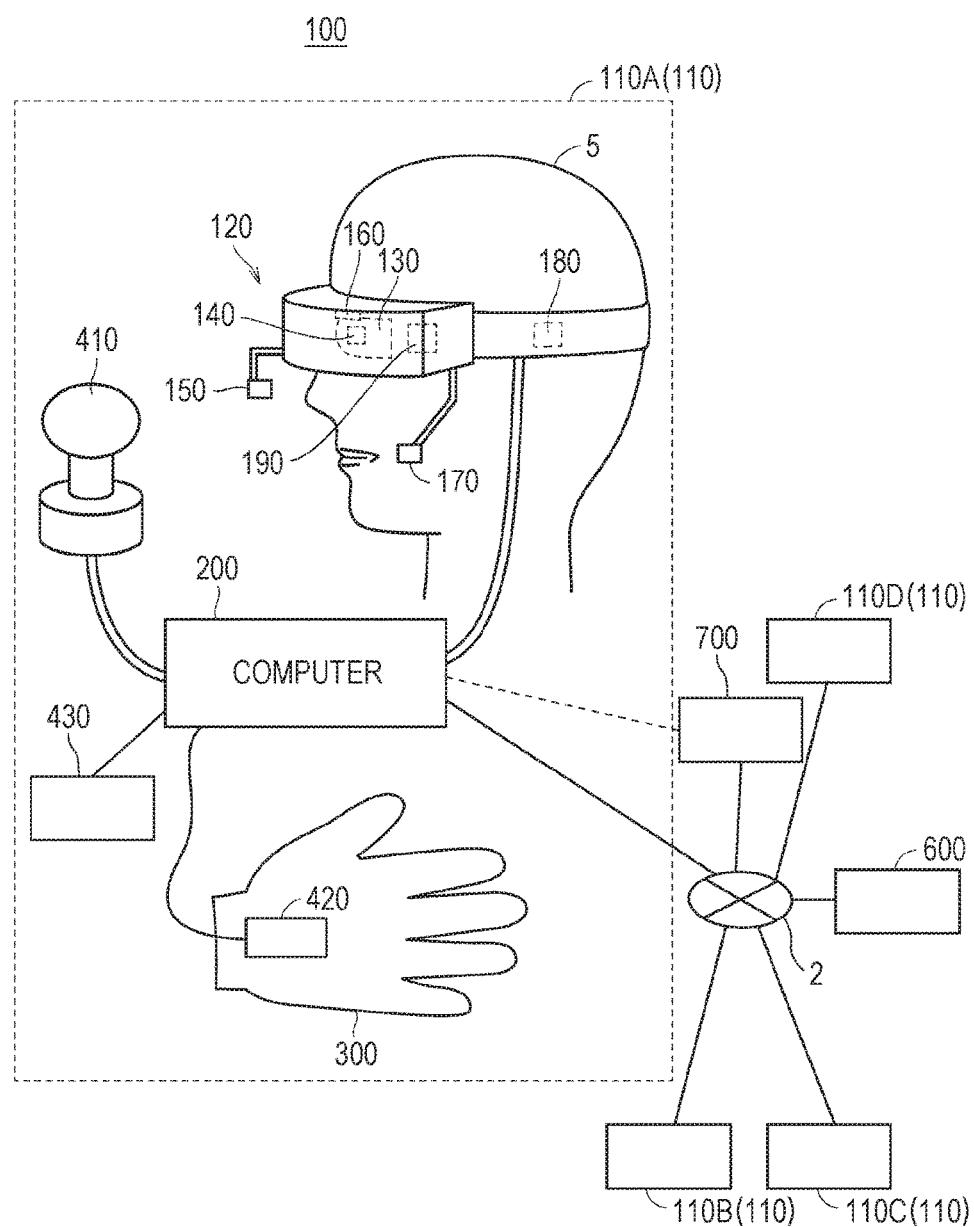
FIG. 1 A diagram of a system including a head-mounted device (HMD) according to at least one embodiment of this disclosure.

An outline of some embodiments of this disclosure is now described.

(1) An information processing method to be executed on a computer in a virtual space distribution system, the virtual space distribution system including a server and a first user terminal including a first head-mounted device worn on a head of a first user. The information processing method includes generating virtual space data defining a virtual space including a second avatar and a first avatar associated with the first user. The information processing method further includes updating a visual field of the first avatar in response to a motion by the first head-mounted device. The information processing method further includes updating a visual-field image displayed on the first head-mounted device based on the visual field of the first avatar and the virtual space data. The information processing method further includes identifying a relative positional relationship between the first avatar and the second avatar. The information processing method further includes displaying in an enlarged manner a part of a virtual body of the second avatar on the visual-field image displayed on the first head-mounted device when a predetermined condition is determined to be satisfied. The predetermined condition includes a condition relating to the relative positional relationship.

In the above-mentioned method, in response to a determination that a predetermined condition including a condition relating to the relative positional relationship between the first avatar and the second avatar is satisfied, a part (e.g., virtual hand) of the virtual body of the second avatar is displayed in an enlarged manner on the visual-field image displayed on the first head-mounted device. In this way, the first user is able to clearly visually recognize a motion by a part of the virtual body of the second avatar by looking at the part of the virtual body of the second avatar displayed in an enlarged manner on the visual-field image. As a result, smooth communication in which body language is used between the first avatar and the second avatar can be achieved. Therefore, a rich virtual experience can be provided to the user.

(2) The information processing method according to Item (1), wherein the relative positional relationship includes a distance between the first avatar and the second avatar, and the condition relating to the relative positional relationship includes a condition that the distance is larger than a predetermined distance.

In the above-mentioned method, the predetermined condition includes a condition that the distance between the first avatar and the second avatar is larger than a predetermined distance. In response to a determination that the predetermined condition is satisfied, the part of the virtual body of the second avatar is displayed in an enlarged manner on the visual-field image displayed on the first head-mounted device. In this way, even when the first avatar is present at a position separated from the second avatar, the first user is able to clearly visually recognize the motion by the part of the virtual body of the second avatar, and hence smooth communication in which body language is used between the first avatar and the second avatar can be achieved.

(3) The information processing method according to Item (1), wherein the relative positional relationship includes a size of the virtual body of the second avatar on the visual-field image displayed on the first head-mounted device, and the condition relating to the relative positional relationship includes a condition that the size of the virtual body of the second avatar is smaller than a predetermined size.

In the above-mentioned method, the predetermined condition includes a condition that the size of the virtual body of the second avatar on the visual-field image displayed on the first head-mounted device is smaller than a predetermined size. In response to a determination that the predetermined condition is satisfied, the part of the virtual body of the second avatar is displayed in an enlarged manner on the visual-field image displayed on the first head-mounted device. In this way, even when the first avatar is present at a position separated from the second avatar, the first user is able to clearly visually recognize the motion by the part of the virtual body of the second avatar, and hence smooth communication in which body language is used between the first avatar and the second avatar can be achieved.

(4) The information processing method according to any one of Items (1) to (3), further includes identifying a line of sight of the second avatar. The predetermined condition further includes a condition relating to the line of sight of the second avatar.

In the above-mentioned method, the predetermined condition includes a condition relating to the relative positional relationship between the first avatar and the second avatar and a condition relating to the line of sight of the second avatar. In response to a determination that the predetermined condition is satisfied, the part of the virtual body of the second avatar is displayed in an enlarged manner on the visual-field image displayed on the first head-mounted device. In this way, the part of the virtual body of the second avatar is displayed in an enlarged manner on the visual-field image in consideration of the state of the line of sight of the second avatar. Therefore, in response to anticipation of communication between the first avatar and the second avatar is to be performed, the part of the virtual body of the second avatar can be displayed in an enlarged manner on the visual-field image.

(5) The information processing according to Item (4), wherein the condition relating to the line of sight of the second avatar includes a condition that the line of sight of the second avatar is directed at the first avatar.

In the above-mentioned method, the predetermined condition includes a condition relating to the relative positional relationship between the first avatar and the second avatar and a condition that the line of sight of the second avatar is directed at the first avatar. In response to a determination that the predetermined condition is satisfied, the part of the virtual body of the second avatar is displayed in an enlarged manner on the visual-field image displayed on the first head-mounted device. In this way, when the line of sight of the second avatar is directed at the first avatar (that is, when the second avatar is looking at the first avatar), the part of the virtual body of the second avatar is displayed in an enlarged manner on the visual-field image. Therefore, in response to anticipation that communication between the first avatar and the second avatar is to be performed, the part of the virtual body of the second avatar can be displayed in an enlarged manner on the visual-field image.

(6) The information processing method according to Item (5), wherein the condition relating to the line of sight of the second avatar includes a condition that the line of sight of the second avatar is directed at the first avatar for longer than a predetermined duration.

In the above-mentioned method, the predetermined condition includes a condition relating to the relative positional relationship between the first avatar and the second avatar and a condition that the line of sight of the second avatar is directed at the first avatar for longer than a predetermined duration. In response to a determination that the predetermined condition is satisfied, the part of the virtual body of the second avatar is displayed in an enlarged manner on the visual-field image displayed on the first head-mounted device. In this way, in response to the line of sight of the second avatar being directed at the first avatar for longer than a predetermined duration (that is, in response to the second avatar looking at the first avatar for longer than a predetermined duration), the part of the virtual body of the second avatar is displayed in an enlarged manner on the visual-field image. Therefore, in response to anticipation that communication between the first avatar and the second avatar is to be performed, the part of the virtual body of the second avatar can be displayed in an enlarged manner on the visual-field image.

(7) The information processing method according to Item (4), wherein the condition relating to the line of sight of the second avatar includes a condition that a duration for which the line of sight of the second avatar is directed from the first avatar at another object is within a predetermined duration.

In the above-mentioned method, the predetermined condition includes a condition relating to the relative positional relationship between the first avatar and the second avatar and a condition that a duration for which the line of sight of the second avatar is directed from the first avatar at another object is within a predetermined duration. In response to a determination that the predetermined condition is satisfied, the part of the virtual body of the second avatar is displayed in an enlarged manner on the visual-field image displayed on the first head-mounted device. In this way, in response to the duration for which the line of sight of the second avatar being directed from the first avatar at another object is within a predetermined duration, the part of the virtual body of the second avatar is displayed in an enlarged manner on the visual-field image. Therefore, in response to anticipation that communication between the first avatar and the second avatar is to continue, the part of the virtual body of the second avatar can be displayed in an enlarged manner on the visual-field image.

(8) The information processing method according to any one of Items (1) to (7), further including (g) identifying a line of sight of the first avatar. The predetermined condition further includes a condition relating to the line of sight of the first avatar.

In the above-mentioned method, the predetermined condition includes a condition relating to the relative positional relationship between the first avatar and the second avatar and a condition relating to the line of sight of the first avatar. In response to a determination that the predetermined condition is satisfied, the part of the virtual body of the second avatar is displayed in an enlarged manner on the visual-field image displayed on the first head-mounted device. In this way, the part of the virtual body of the second avatar is displayed in an enlarged manner on the visual-field image in consideration of the state of the line of sight of the first avatar. Therefore, in response to anticipation that communication between the first avatar and the second avatar is to be performed, the part of the virtual body of the second avatar can be displayed in an enlarged manner on the visual-field image.

(9) The information processing method according to any one of Items (1) to (8), further including acquiring information on a part of the virtual body of the second avatar. The predetermined condition further includes a condition relating to the part of the virtual body of the second avatar.

In the above-mentioned method, the predetermined condition includes a condition relating to the relative positional relationship between the first avatar and the second avatar and a condition relating to the part of the virtual body of the second avatar. In response to a determination that the predetermined condition is satisfied, the part of the virtual body of the second avatar is displayed in an enlarged manner on the visual-field image displayed on the first head-mounted device. In this way, the part of the virtual body of the second avatar is displayed in an enlarged manner on the visual-field image in consideration of the part of the virtual body of the second avatar. Therefore, in response to anticipation that communication between the first avatar and the second avatar is to be performed, the part of the virtual body of the second avatar can be displayed in an enlarged manner on the visual-field image.

(10) The information processing method according to Item (9), wherein the condition relating to the part of the virtual body of the second avatar includes a condition that a position of the part of the virtual body in a height direction of the virtual space is within a predetermined range.

In the above-mentioned method, the predetermined condition includes a condition relating to the relative positional relationship between the first avatar and the second avatar and a condition that a position of the part of the virtual body in a height direction of the virtual space is within a predetermined range. In response to a determination that the predetermined condition is satisfied, the part of the virtual body of the second avatar is displayed in an enlarged manner on the visual-field image displayed on the first head-mounted device. In this way, the part of the virtual body of the second avatar is displayed in an enlarged manner on the visual-field image when the position of the part of the virtual body in the height direction of the virtual space is within the predetermined range. Therefore, in response to anticipation that communication between the first avatar and the second avatar is to be performed, the part of the virtual body of the second avatar can be displayed in an enlarged manner on the visual-field image.

(11) The information processing method according to Item (9), wherein the condition relating to the part of the virtual body of the second avatar includes a condition that a shape of the part of the virtual body includes a predetermined shape.

In the above-mentioned method, the predetermined condition includes a condition relating to the relative positional relationship between the first avatar and the second avatar and a condition that a shape of the part of the virtual body includes a predetermined shape. In response to a determination that the predetermined condition is satisfied, the part of the virtual body of the second avatar is displayed in an enlarged manner on the visual-field image displayed on the first head-mounted device. In this way, the part of the virtual body of the second avatar is displayed in an enlarged manner on the visual-field image when the shape of the part of the virtual body includes a predetermined shape. Therefore, in response to anticipation that communication between the first avatar and the second avatar is to be performed, the part of the virtual body of the second avatar can be displayed in an enlarged manner on the visual-field image.

(12) The information processing method according to any one of Items (1) to (11), further including acquiring sound data representing a sound relating to the second avatar. The predetermined condition further includes acquiring the sound data.

In the above-mentioned method, the predetermined condition includes acquiring sound data relating to the second avatar. In response to a determination that the predetermined condition is satisfied, a part of the virtual body of the second avatar is displayed in an enlarged manner on the visual-field image displayed on the first head-mounted device. Therefore, in response to anticipation that communication between the first avatar and the second avatar is to be performed, a part of the virtual body of the second avatar can be displayed in an enlarged manner on the visual-field image.

(13) A system for executing the information processing method of any one of Items (1) to (12).

According to the above-mentioned system, a rich virtual experience can be provided to a user.

Details of Embodiments of this Disclosure

Now, with reference to the drawings, embodiments of this technical idea are described in detail. In the following description, like components are denoted by like reference symbols. The same applies to the names and functions of those components. Therefore, detailed description of those components is not repeated. In one or more embodiments described in this disclosure, components of respective embodiments can be combined with each other, and the combination also serves as a part of the embodiments described in this disclosure.

Configuration of HMD System

With reference to FIG. 1, a configuration of a head-mounted device (HMD) system 100 is described. FIG. 1 is a diagram of a system 100 including a head-mounted display (HMD) according to at least one embodiment of this disclosure. The system 100 is usable for household use or for professional use.

The system 100 includes a server 600, HMD sets 110A, 110B, 110C, and 110D, an external device 700, and a network 2. Each of the HMD sets 110A, 110B, 110C, and 110D is capable of independently communicating to/from the server 600 or the external device 700 via the network 2. In some instances, the HMD sets 110A, 110B, 110C, and 110D are also collectively referred to as "HMD set 110". The number of HMD sets 110 constructing the HMD system 100 is not limited to four, but may be three or less, or five or more. The HMD set 110 includes an HMD 120, a computer 200, an HMD sensor 410, a display 430, and a controller 300. The HMD 120 includes a monitor 130, an eye gaze sensor 140, a first camera 150, a second camera 160, a microphone 170, and a speaker 180. In at least one embodiment, the controller 300 includes a motion sensor 420.

In at least one aspect, the computer 200 is connected to the network 2, for example, the Internet, and is able to communicate to/from the server 600 or other computers connected to the network 2 in a wired or wireless manner. Examples of the other computers include a computer of another HMD set 110 or the external device 700. In at least one aspect, the HMD 120 includes a sensor 190 instead of the HMD sensor 410. In at least one aspect, the HMD 120 includes both sensor 190 and the HMD sensor 410.

The HMD 120 is wearable on a head of a user 5 to display a virtual space to the user 5 during operation. More specifically, in at least one embodiment, the HMD 120 displays each of a right-eye image and a left-eye image on the monitor 130. Each eye of the user 5 is able to visually recognize a corresponding image from the right-eye image and the left-eye image so that the user 5 may recognize a three-dimensional image based on the parallax of both of the user's the eyes. In at least one embodiment, the HMD 120 includes any one of a so-called head-mounted display including a monitor or a head-mounted device capable of mounting a smartphone or other terminals including a monitor.

The monitor 130 is implemented as, for example, a non-transmissive display device. In at least one aspect, the monitor 130 is arranged on a main body of the HMD 120 so as to be positioned in front of both the eyes of the user 5. Therefore, when the user 5 is able to visually recognize the three-dimensional image displayed by the monitor 130, the user 5 is immersed in the virtual space. In at least one aspect, the virtual space includes, for example, a background, objects that are operable by the user 5, or menu images that are selectable by the user 5. In at least one aspect, the monitor 130 is implemented as a liquid crystal monitor or an organic electroluminescence (EL) monitor included in a so-called smartphone or other information display terminals.

In at least one aspect, the monitor 130 is implemented as a transmissive display device. In this case, the user 5 is able to see through the HMD 120 covering the eyes of the user 5, for example, smartglasses. In at least one embodiment, the transmissive monitor 130 is configured as a temporarily non-transmissive display device through adjustment of a transmittance thereof. In at least one embodiment, the monitor 130 is configured to display a real space and a part of an image constructing the virtual space simultaneously. For example, in at least one embodiment, the monitor 130 displays an image of the real space captured by a camera mounted on the HMD 120, or may enable recognition of the real space by setting the transmittance of a part the monitor 130 sufficiently high to permit the user 5 to see through the HMD 120.

In at least one aspect, the monitor 130 includes a sub-monitor for displaying a right-eye image and a sub-monitor for displaying a left-eye image. In at least one aspect, the monitor 130 is configured to integrally display the right-eye image and the left-eye image. In this case, the monitor 130 includes a high-speed shutter. The high-speed shutter operates so as to alternately display the right-eye image to the right of the user 5 and the left-eye image to the left eye of the user 5, so that only one of the user's 5 eyes is able to recognize the image at any single point in time.

In at least one aspect, the HMD 120 includes a plurality of light sources (not shown). Each light source is implemented by, for example, a light emitting diode (LED) configured to emit an infrared ray. The HMD sensor 410 has a position tracking function for detecting the motion of the HMD 120. More specifically, the HMD sensor 410 reads a plurality of infrared rays emitted by the HMD 120 to detect the position and the inclination of the HMD 120 in the real space.

In at least one aspect, the HMD sensor 410 is implemented by a camera. In at least one aspect, the HMD sensor 410 uses image information of the HMD 120 output from the camera to execute image analysis processing, to thereby enable detection of the position and the inclination of the HMD 120.

In at least one aspect, the HMD 120 includes the sensor 190 instead of, or in addition to, the HMD sensor 410 as a position detector. In at least one aspect, the HMD 120 uses the sensor 190 to detect the position and the inclination of the HMD 120. For example, in at least one embodiment, when the sensor 190 is an angular velocity sensor, a geomagnetic sensor, or an acceleration sensor, the HMD 120 uses any or all of those sensors instead of (or in addition to) the HMD sensor 410 to detect the position and the inclination of the HMD 120. As an example, when the sensor 190 is an angular velocity sensor, the angular velocity sensor detects over time the angular velocity about each of three axes of the HMD 120 in the real space. The HMD 120 calculates a temporal change of the angle about each of the three axes of the HMD 120 based on each angular velocity, and further calculates an inclination of the HMD 120 based on the temporal change of the angles.

The eye gaze sensor 140 detects a direction in which the lines of sight of the right eye and the left eye of the user 5 are directed. That is, the eye gaze sensor 140 detects the line of sight of the user 5. The direction of the line of sight is detected by, for example, a known eye tracking function. The eye gaze sensor 140 is implemented by a sensor having the eye tracking function. In at least one aspect, the eye gaze sensor 140 includes a right-eye sensor and a left-eye sensor. In at least one embodiment, the eye gaze sensor 140 is, for example, a sensor configured to irradiate the right eye and the left eye of the user 5 with an infrared ray, and to receive reflection light from the cornea and the iris with respect to the irradiation light, to thereby detect a rotational angle of each of the user's 5 eyeballs. In at least one embodiment, the eye gaze sensor 140 detects the line of sight of the user 5 based on each detected rotational angle.

The first camera 150 photographs a lower part of a face of the user 5. More specifically, the first camera 150 photographs, for example, the nose or mouth of the user 5. The second camera 160 photographs, for example, the eyes and eyebrows of the user 5. A side of a casing of the HMD 120 on the user 5 side is defined as an interior side of the HMD 120, and a side of the casing of the HMD 120 on a side opposite to the user 5 side is defined as an exterior side of the HMD 120. In at least one aspect, the first camera 150 is arranged on an exterior side of the HMD 120, and the second camera 160 is arranged on an interior side of the HMD 120. Images generated by the first camera 150 and the second camera 160 are input to the computer 200. In at least one aspect, the first camera 150 and the second camera 160 are implemented as a single camera, and the face of the user 5 is photographed with this single camera.

The microphone 170 converts an utterance of the user 5 into a voice signal (electric signal) for output to the computer 200. The speaker 180 converts the voice signal into a voice for output to the user 5. In at least one embodiment, the speaker 180 converts other signals into audio information provided to the user 5. In at least one aspect, the HMD 120 includes earphones in place of the speaker 180.

The controller 300 is connected to the computer 200 through wired or wireless communication. The controller 300 receives input of a command from the user 5 to the computer 200. In at least one aspect, the controller 300 is held by the user 5. In at least one aspect, the controller 300 is mountable to the body or a part of the clothes of the user 5. In at least one aspect, the controller 300 is configured to output at least any one of a vibration, a sound, or light based on the signal transmitted from the computer 200. In at least one aspect, the controller 300 receives from the user 5 an operation for controlling the position and the motion of an object arranged in the virtual space.

In at least one aspect, the controller 300 includes a plurality of light sources. Each light source is implemented by, for example, an LED configured to emit an infrared ray. The HMD sensor 410 has a position tracking function. In this case, the HMD sensor 410 reads a plurality of infrared rays emitted by the controller 300 to detect the position and the inclination of the controller 300 in the real space. In at least one aspect, the HMD sensor 410 is implemented by a camera. In this case, the HMD sensor 410 uses image information of the controller 300 output from the camera to execute image analysis processing, to thereby enable detection of the position and the inclination of the controller 300.

In at least one aspect, the motion sensor 420 is mountable on the hand of the user 5 to detect the motion of the hand of the user 5. For example, the motion sensor 420 detects a rotational speed, a rotation angle, and the number of rotations of the hand. The detected signal is transmitted to the computer 200. The motion sensor 420 is provided to, for example, the controller 300. In at least one aspect, the motion sensor 420 is provided to, for example, the controller 300 capable of being held by the user 5. In at least one aspect, to help prevent accidently release of the controller 300 in the real space, the controller 300 is mountable on an object like a glove-type object that does not easily fly away by being worn on a hand of the user 5. In at least one aspect, a sensor that is not mountable on the user 5 detects the motion of the hand of the user 5. For example, a signal of a camera that photographs the user 5 may be input to the computer 200 as a signal representing the motion of the user 5. As at least one example, the motion sensor 420 and the computer 200 are connected to each other through wired or wireless communication. In the case of wireless communication, the communication mode is not particularly limited, and for example, Bluetooth (trademark) or other known communication methods are usable.

The display 430 displays an image similar to an image displayed on the monitor 130. With this, a user other than the user 5 wearing the HMD 120 can also view an image similar to that of the user 5. An image to be displayed on the display 430 is not required to be a three-dimensional image, but may be a right-eye image or a left-eye image. For example, a liquid crystal display or an organic EL monitor may be used as the display 430.

In at least one embodiment, the server 600 transmits a program to the computer 200. In at least one aspect, the server 600 communicates to/from another computer 200 for providing virtual reality to the HMD 120 used by another user. For example, when a plurality of users play a participatory game, for example, in an amusement facility, each computer 200 communicates to/from another computer 200 via the server 600 with a signal that is based on the motion of each user, to thereby enable the plurality of users to enjoy a common game in the same virtual space. Each computer 200 may communicate to/from another computer 200 with the signal that is based on the motion of each user without intervention of the server 600.

The external device 700 is any suitable device as long as the external device 700 is capable of communicating to/from the computer 200. The external device 700 is, for example, a device capable of communicating to/from the computer 200 via the network 2, or is a device capable of directly communicating to/from the computer 200 by near field communication or wired communication. Peripheral devices such as a smart device, a personal computer (PC), or the computer 200 are usable as the external device 700, in at least one embodiment, but the external device 700 is not limited thereto.

Hardware Configuration of Computer

Figure 2:
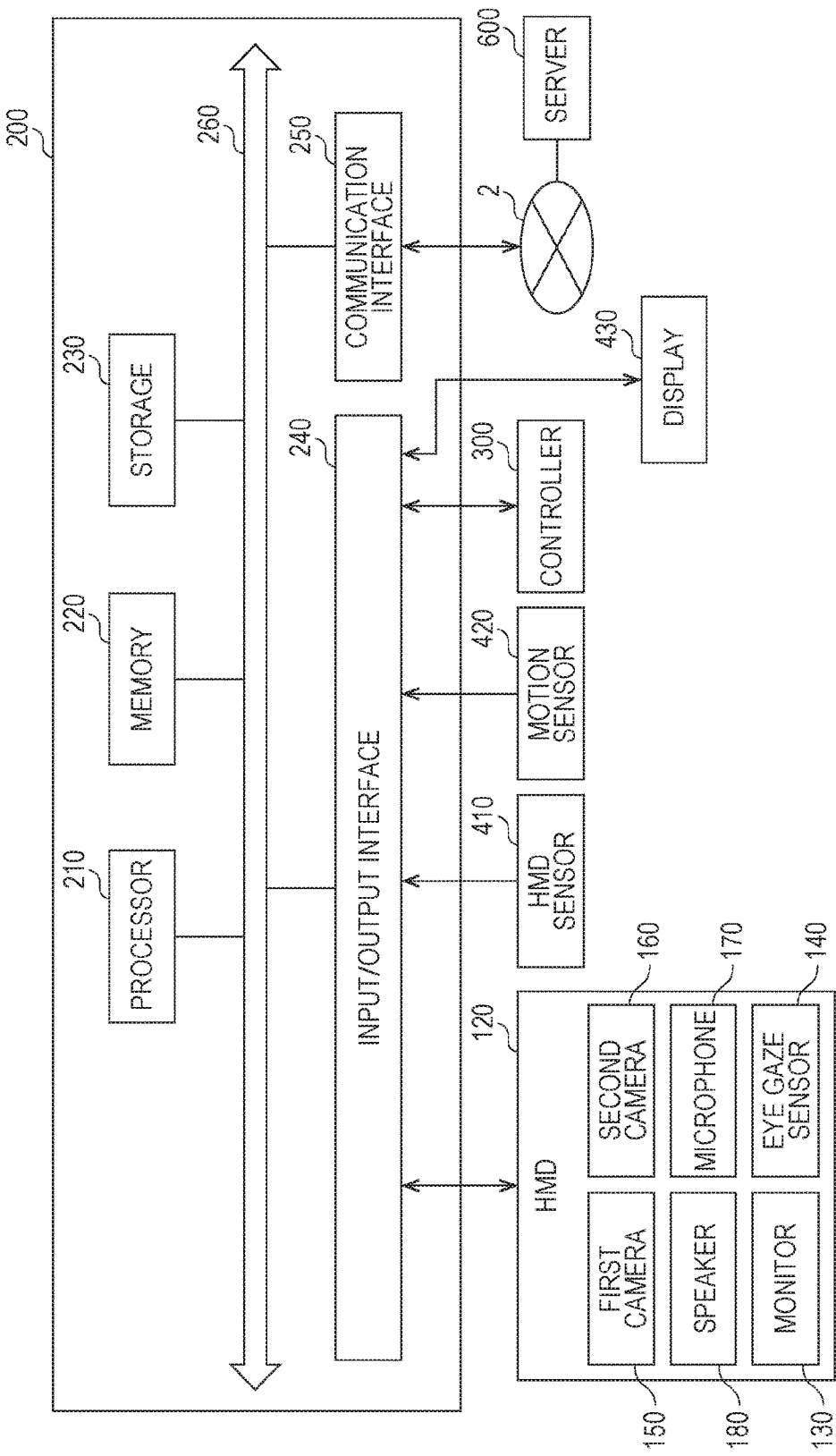
FIG. 2 A block diagram of a hardware configuration of a computer according to at least one embodiment of this disclosure.

With reference to FIG. 2, the computer 200 in at least one embodiment is described. FIG. 2 is a block diagram of a hardware configuration of the computer 200 according to at least one embodiment. The computer 200 includes, a processor 210, a memory 220, a storage 230, an input/output interface 240, and a communication interface 250. Each component is connected to a bus 260. In at least one embodiment, at least one of the processor 210, the memory 220, the storage 230, the input/output interface 240 or the communication interface 250 is part of a separate structure and communicates with other components of computer 200 through a communication path other than the bus 260.

The processor 210 executes a series of commands included in a program stored in the memory 220 or the storage 230 based on a signal transmitted to the computer 200 or in response to a condition determined in advance. In at least one aspect, the processor 210 is implemented as a central processing unit (CPU), a graphics processing unit (GPU), a micro-processor unit (MPU), a field-programmable gate array (FPGA), or other devices.

The memory 220 temporarily stores programs and data. The programs are loaded from, for example, the storage 230. The data includes data input to the computer 200 and data generated by the processor 210. In at least one aspect, the memory 220 is implemented as a random access memory (RAM) or other volatile memories.

The storage 230 permanently stores programs and data. In at least one embodiment, the storage 230 stores programs and data for a period of time longer than the memory 220, but not permanently. The storage 230 is implemented as, for example, a read-only memory (ROM), a hard disk device, a flash memory, or other non-volatile storage devices. The programs stored in the storage 230 include programs for providing a virtual space in the system 100, simulation programs, game programs, user authentication programs, and programs for implementing communication to/from other computers 200. The data stored in the storage 230 includes data and objects for defining the virtual space.

In at least one aspect, the storage 230 is implemented as a removable storage device like a memory card. In at least one aspect, a configuration that uses programs and data stored in an external storage device is used instead of the storage 230 built into the computer 200. With such a configuration, for example, in a situation in which a plurality of HMD systems 100 are used, for example in an amusement facility, the programs and the data are collectively updated.

The input/output interface 240 allows communication of signals among the HMD 120, the HMD sensor 410, the motion sensor 420, and the display 430. The monitor 130, the eye gaze sensor 140, the first camera 150, the second camera 160, the microphone 170, and the speaker 180 included in the HMD 120 may communicate to/from the computer 200 via the input/output interface 240 of the HMD 120. In at least one aspect, the input/output interface 240 is implemented with use of a universal serial bus (USB), a digital visual interface (DVI), a high-definition multimedia interface (HDMI) (trademark), or other terminals. The input/output interface 240 is not limited to the specific examples described above.

In at least one aspect, the input/output interface 240 further communicates to/from the controller 300. For example, the input/output interface 240 receives input of a signal output from the controller 300 and the motion sensor 420. In at least one aspect, the input/output interface 240 transmits a command output from the processor 210 to the controller 300. The command instructs the controller 300 to, for example, vibrate, output a sound, or emit light. When the controller 300 receives the command, the controller 300 executes any one of vibration, sound output, and light emission in accordance with the command.

The communication interface 250 is connected to the network 2 to communicate to/from other computers (e.g., server 600) connected to the network 2. In at least one aspect, the communication interface 250 is implemented as, for example, a local area network (LAN), other wired communication interfaces, wireless fidelity (Wi-Fi), Bluetooth®, near field communication (NFC), or other wireless communication interfaces. The communication interface 250 is not limited to the specific examples described above.

In at least one aspect, the processor 210 accesses the storage 230 and loads one or more programs stored in the storage 230 to the memory 220 to execute a series of commands included in the program. In at least one embodiment, the one or more programs includes an operating system of the computer 200, an application program for providing a virtual space, and/or game software that is executable in the virtual space. The processor 210 transmits a signal for providing a virtual space to the HMD 120 via the input/output interface 240. The HMD 120 displays a video on the monitor 130 based on the signal.

In FIG. 2, the computer 200 is outside of the HMD 120, but in at least one aspect, the computer 200 is integral with the HMD 120. As an example, a portable information communication terminal (e.g., smartphone) including the monitor 130 functions as the computer 200 in at least one embodiment.

In at least one embodiment, the computer 200 is used in common with a plurality of HMDs 120. With such a configuration, for example, the computer 200 is able to provide the same virtual space to a plurality of users, and hence each user can enjoy the same application with other users in the same virtual space.

According to at least one embodiment of this disclosure, in the system 100, a real coordinate system is set in advance. The real coordinate system is a coordinate system in the real space. The real coordinate system has three reference directions (axes) that are respectively parallel to a vertical direction, a horizontal direction orthogonal to the vertical direction, and a front-rear direction orthogonal to both of the vertical direction and the horizontal direction in the real space. The horizontal direction, the vertical direction (up-down direction), and the front-rear direction in the real coordinate system are defined as an x axis, a y axis, and a z axis, respectively. More specifically, the x axis of the real coordinate system is parallel to the horizontal direction of the real space, the y axis thereof is parallel to the vertical direction of the real space, and the z axis thereof is parallel to the front-rear direction of the real space.

In at least one aspect, the HMD sensor 410 includes an infrared sensor. When the infrared sensor detects the infrared ray emitted from each light source of the HMD 120, the infrared sensor detects the presence of the HMD 120. The HMD sensor 410 further detects the position and the inclination (direction) of the HMD 120 in the real space, which corresponds to the motion of the user 5 wearing the HMD 120, based on the value of each point (each coordinate value in the real coordinate system). In more detail, the HMD sensor 410 is able to detect the temporal change of the position and the inclination of the HMD 120 with use of each value detected over time.

Each inclination of the HMD 120 detected by the HMD sensor 410 corresponds to an inclination about each of the three axes of the HMD 120 in the real coordinate system. The HMD sensor 410 sets a uvw visual-field coordinate system to the HMD 120 based on the inclination of the HMD 120 in the real coordinate system. The uvw visual-field coordinate system set to the HMD 120 corresponds to a point-of-view coordinate system used when the user 5 wearing the HMD 120 views an object in the virtual space.

Uvw Visual-Field Coordinate System

Figure 3:
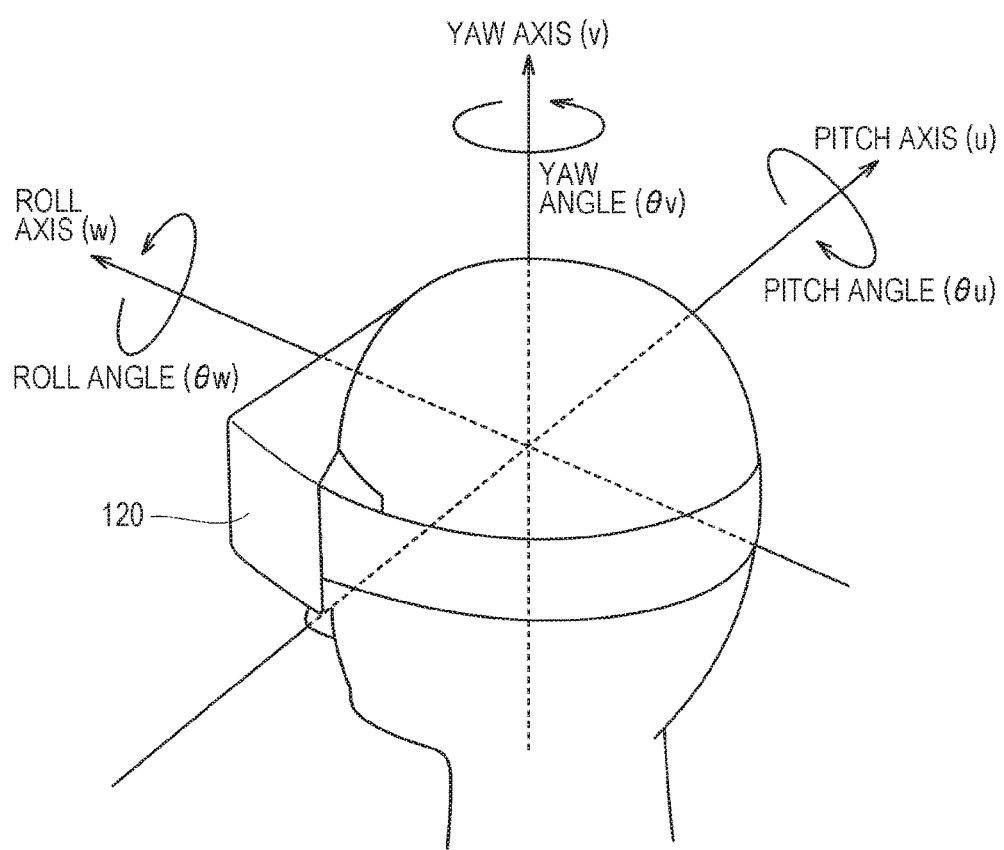
FIG. 3 A diagram of a uvw visual-field coordinate system to be set for an HMD according to at least one embodiment of this disclosure.

With reference to FIG. 3, the uvw visual-field coordinate system is described. FIG. 3 is a diagram of a uvw visual-field coordinate system to be set for the HMD 120 according to at least one embodiment of this disclosure. The HMD sensor 410 detects the position and the inclination of the HMD 120 in the real coordinate system when the HMD 120 is activated. The processor 210 sets the uvw visual-field coordinate system to the HMD 120 based on the detected values.

In FIG. 3, the HMD 120 sets the three-dimensional uvw visual-field coordinate system defining the head of the user 5 wearing the HMD 120 as a center (origin). More specifically, the HMD 120 sets three directions newly obtained by inclining the horizontal direction, the vertical direction, and the front-rear direction (x axis, y axis, and z axis), which define the real coordinate system, about the respective axes by the inclinations about the respective axes of the HMD 120 in the real coordinate system, as a pitch axis (u axis), a yaw axis (v axis), and a roll axis (w axis) of the uvw visual-field coordinate system in the HMD 120.

In at least one aspect, when the user 5 wearing the HMD 120 is standing (or sitting) upright and is visually recognizing the front side, the processor 210 sets the uvw visual-field coordinate system that is parallel to the real coordinate system to the HMD 120. In this case, the horizontal direction (x axis), the vertical direction (y axis), and the front-rear direction (z axis) of the real coordinate system directly match the pitch axis (u axis), the yaw axis (v axis), and the roll axis (w axis) of the uvw visual-field coordinate system in the HMD 120, respectively.

After the uvw visual-field coordinate system is set to the HMD 120, the HMD sensor 410 is able to detect the inclination of the HMD 120 in the set uvw visual-field coordinate system based on the motion of the HMD 120. In this case, the HMD sensor 410 detects, as the inclination of the HMD 120, each of a pitch angle ($\theta u$), a yaw angle ($\theta v$), and a roll angle ($\theta w$) of the HMD 120 in the uvw visual-field coordinate system. The pitch angle ($\theta u$) represents an inclination angle of the HMD 120 about the pitch axis in the uvw visual-field coordinate system. The yaw angle ($\theta v$) represents an inclination angle of the HMD 120 about the yaw axis in the uvw visual-field coordinate system. The roll angle ($\theta w$) represents an inclination angle of the HMD 120 about the roll axis in the uvw visual-field coordinate system.

The HMD sensor 410 sets, to the HMD 120, the uvw visual-field coordinate system of the HMD 120 obtained after the movement of the HMD 120 based on the detected inclination angle of the HMD 120. The relationship between the HMD 120 and the uvw visual-field coordinate system of the HMD 120 is constant regardless of the position and the inclination of the HMD 120. When the position and the inclination of the HMD 120 change, the position and the inclination of the uvw visual-field coordinate system of the HMD 120 in the real coordinate system change in synchronization with the change of the position and the inclination.

In at least one aspect, the HMD sensor 410 identifies the position of the HMD 120 in the real space as a position relative to the HMD sensor 410 based on the light intensity of the infrared ray or a relative positional relationship between a plurality of points (e.g., distance between points), which is acquired based on output from the infrared sensor. In at least one aspect, the processor 210 determines the origin of the uvw visual-field coordinate system of the HMD 120 in the real space (real coordinate system) based on the identified relative position.

Virtual Space

Figure 4:
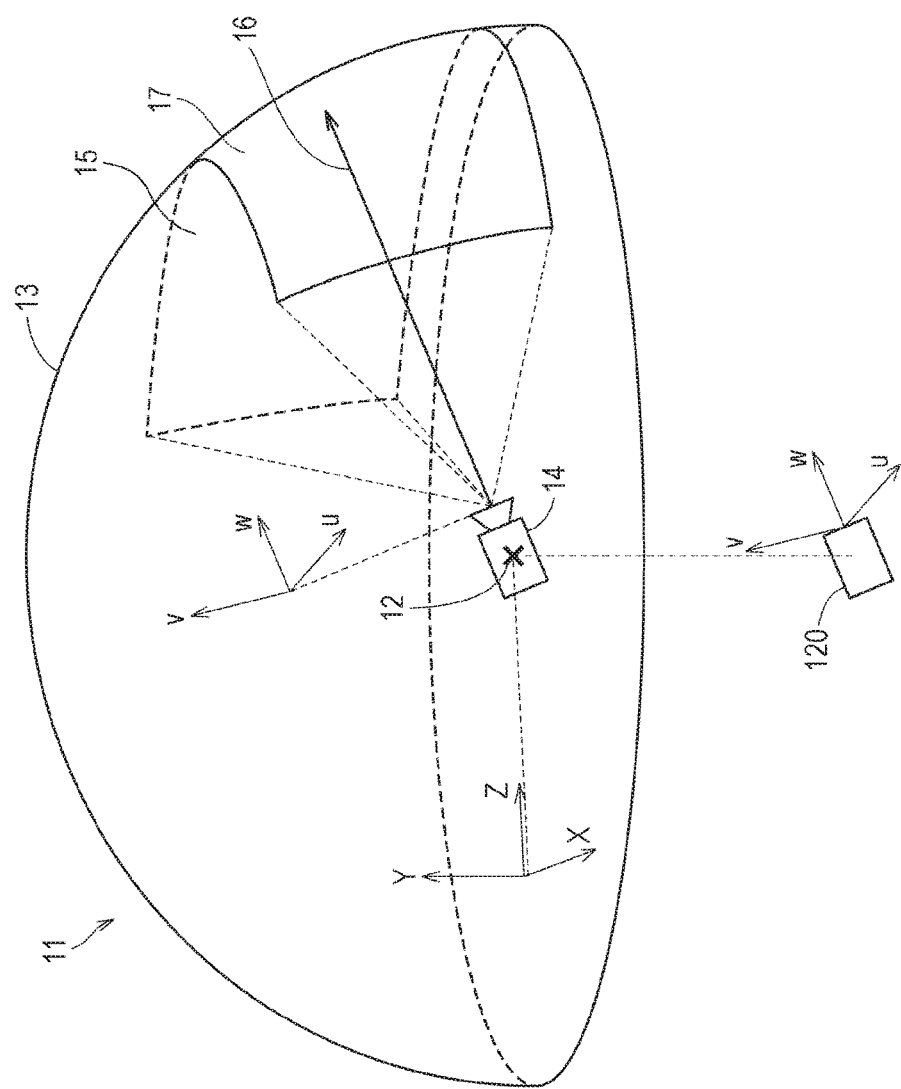
FIG. 4 A diagram of a mode of expressing a virtual space according to at least one embodiment of this disclosure.

With reference to FIG. 4, the virtual space is further described. FIG. 4 is a diagram of a mode of expressing a virtual space 11 according to at least one embodiment of this disclosure. The virtual space 11 has a structure with an entire celestial sphere shape covering a center 12 in all 360-degree directions. In FIG. 4, for the sake of clarity, only the upper-half celestial sphere of the virtual space 11 is included. Each mesh section is defined in the virtual space 11. The position of each mesh section is defined in advance as coordinate values in an XYZ coordinate system, which is a global coordinate system defined in the virtual space 11. The computer 200 associates each partial image forming a panorama image 13 (e.g., still image or moving image) that is developed in the virtual space 11 with each corresponding mesh section in the virtual space 11.

In at least one aspect, in the virtual space 11, the XYZ coordinate system having the center 12 as the origin is defined. The XYZ coordinate system is, for example, parallel to the real coordinate system. The horizontal direction, the vertical direction (up-down direction), and the front-rear direction of the XYZ coordinate system are defined as an X axis, a Y axis, and a Z axis, respectively. Thus, the X axis (horizontal direction) of the XYZ coordinate system is parallel to the x axis of the real coordinate system, the Y axis (vertical direction) of the XYZ coordinate system is parallel to the y axis of the real coordinate system, and the Z axis (front-rear direction) of the XYZ coordinate system is parallel to the z axis of the real coordinate system.

When the HMD 120 is activated, that is, when the HMD 120 is in an initial state, a virtual camera 14 is arranged at the center 12 of the virtual space 11. In at least one embodiment, the virtual camera 14 is offset from the center 12 in the initial state. In at least one aspect, the processor 210 displays on the monitor 130 of the HMD 120 an image photographed by the virtual camera 14. In synchronization with the motion of the HMD 120 in the real space, the virtual camera 14 similarly moves in the virtual space 11. With this, the change in position and direction of the HMD 120 in the real space is reproduced similarly in the virtual space 11.

The uvw visual-field coordinate system is defined in the virtual camera 14 similarly to the case of the HMD 120. The uvw visual-field coordinate system of the virtual camera 14 in the virtual space 11 is defined to be synchronized with the uvw visual-field coordinate system of the HMD 120 in the real space (real coordinate system). Therefore, when the inclination of the HMD 120 changes, the inclination of the virtual camera 14 also changes in synchronization therewith. The virtual camera 14 can also move in the virtual space 11 in synchronization with the movement of the user 5 wearing the HMD 120 in the real space.

The processor 210 of the computer 200 defines a field-of-view region 15 in the virtual space 11 based on the position and inclination (reference line of sight 16) of the virtual camera 14. The field-of-view region 15 corresponds to, of the virtual space 11, the region that is visually recognized by the user 5 wearing the HMD 120. That is, the position of the virtual camera 14 determines a point of view of the user 5 in the virtual space 11.

The line of sight of the user 5 detected by the eye gaze sensor 140 is a direction in the point-of-view coordinate system obtained when the user 5 visually recognizes an object. The uvw visual-field coordinate system of the HMD 120 is equal to the point-of-view coordinate system used when the user 5 visually recognizes the monitor 130. The uvw visual-field coordinate system of the virtual camera 14 is synchronized with the uvw visual-field coordinate system of the HMD 120. Therefore, in the system 100 in at least one aspect, the line of sight of the user 5 detected by the eye gaze sensor 140 can be regarded as the line of sight of the user 5 in the uvw visual-field coordinate system of the virtual camera 14.

User's Line of Sight

Figure 5:
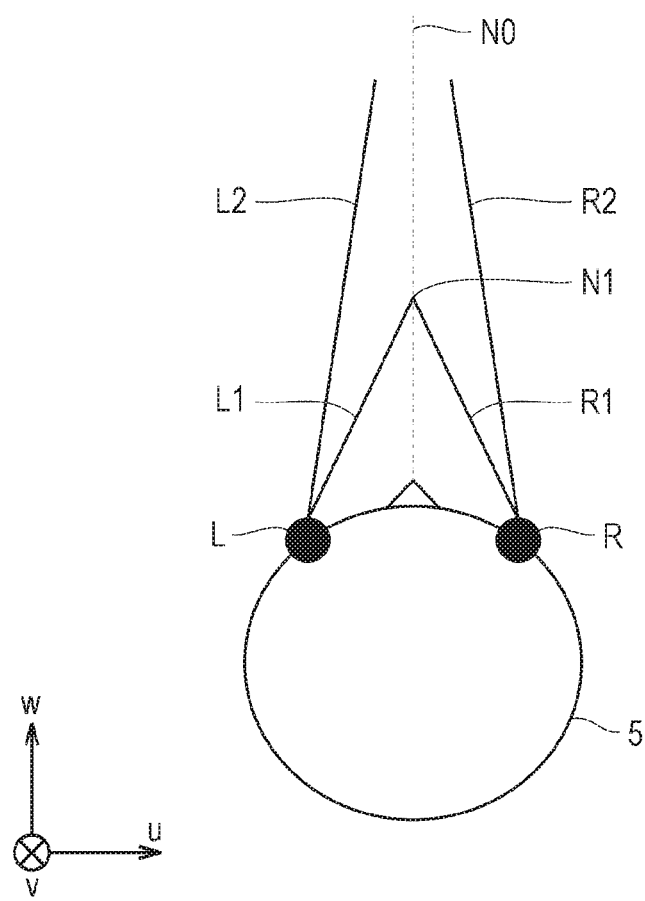
FIG. 5 A diagram of a plan view of a head of a user wearing the HMD according to at least one embodiment of this disclosure.

With reference to FIG. 5, determination of the line of sight of the user 5 is described. FIG. 5 is a plan view diagram of the head of the user 5 wearing the HMD 120 according to at least one embodiment of this disclosure.

In at least one aspect, the eye gaze sensor 140 detects lines of sight of the right eye and the left eye of the user 5. In at least one aspect, when the user 5 is looking at a near place, the eye gaze sensor 140 detects lines of sight R1 and L1. In at least one aspect, when the user 5 is looking at a far place, the eye gaze sensor 140 detects lines of sight R2 and L2. In this case, the angles formed by the lines of sight R2 and L2 with respect to the roll axis w are smaller than the angles formed by the lines of sight R1 and L1 with respect to the roll axis w. The eye gaze sensor 140 transmits the detection results to the computer 200.

When the computer 200 receives the detection values of the lines of sight R1 and L1 from the eye gaze sensor 140 as the detection results of the lines of sight, the computer 200 identifies a point of gaze N1 being an intersection of both the lines of sight R1 and L1 based on the detection values. Meanwhile, when the computer 200 receives the detection values of the lines of sight R2 and L2 from the eye gaze sensor 140, the computer 200 identifies an intersection of both the lines of sight R2 and L2 as the point of gaze. The computer 200 identifies a line of sight N0 of the user 5 based on the identified point of gaze N1. The computer 200 detects, for example, an extension direction of a straight line that passes through the point of gaze N1 and a midpoint of a straight line connecting a right eye R and a left eye L of the user 5 to each other as the line of sight N0. The line of sight N0 is a direction in which the user 5 actually directs his or her lines of sight with both eyes. The line of sight N0 corresponds to a direction in which the user 5 actually directs his or her lines of sight with respect to the field-of-view region 15.

In at least one aspect, the system 100 includes a television broadcast reception tuner. With such a configuration, the system 100 is able to display a television program in the virtual space 11.

In at least one aspect, the HMD system 100 includes a communication circuit for connecting to the Internet or has a verbal communication function for connecting to a telephone line or a cellular service.

Field-of-View Region

Figure 6:
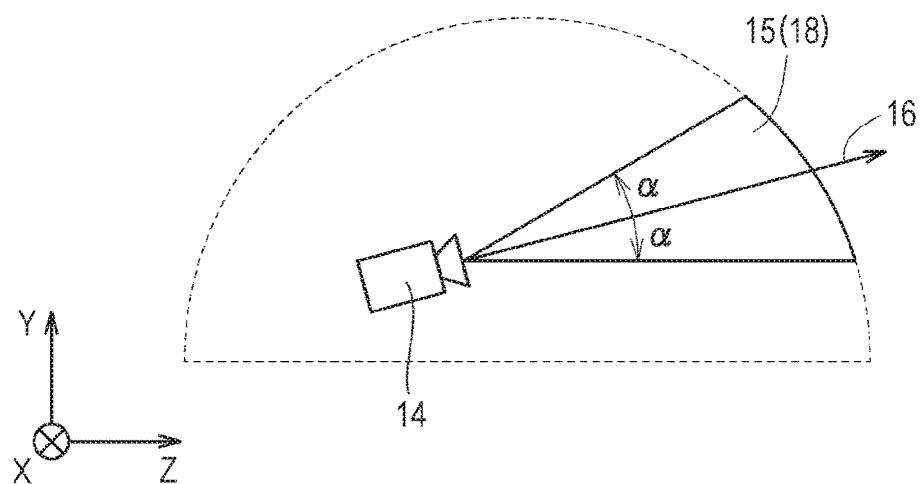
FIG. 6 A diagram of a YZ cross section obtained by viewing a field-of-view region from an X direction in the virtual space according to at least one embodiment of this disclosure.
Figure 7:
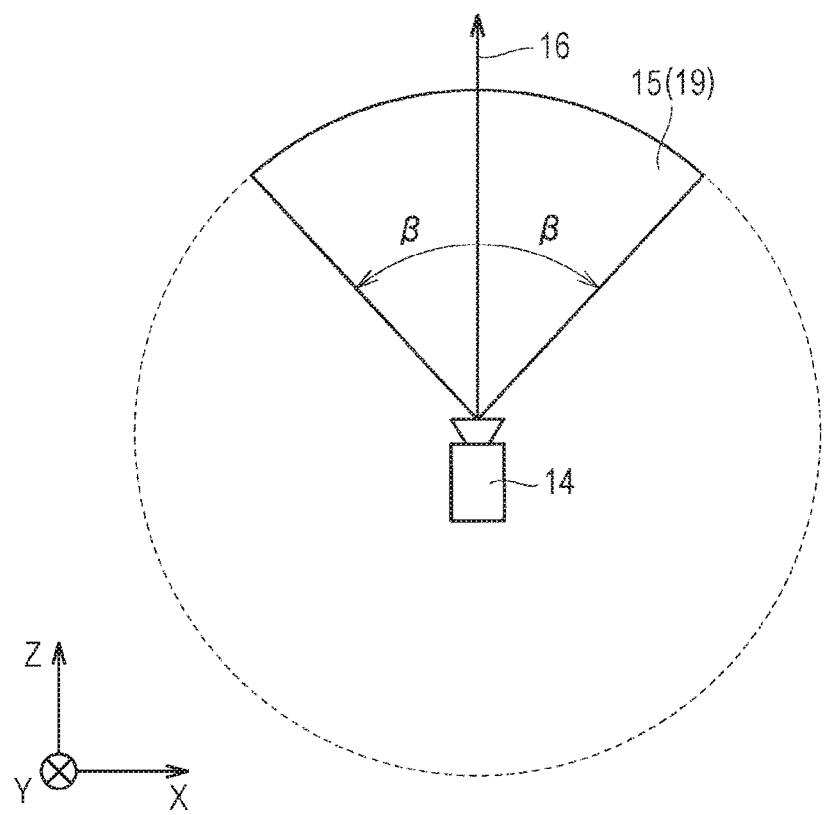
FIG. 7 A diagram of an XZ cross section obtained by viewing the field-of-view region from a Y direction in the virtual space according to at least one embodiment of this disclosure.

With reference to FIG. 6 and FIG. 7, the field-of-view region 15 is described. FIG. 6 is a diagram of a YZ cross section obtained by viewing the field-of-view region 15 from an X direction in the virtual space 11. FIG. 7 is a diagram of an XZ cross section obtained by viewing the field-of-view region 15 from a Y direction in the virtual space 11.

In FIG. 6, the field-of-view region 15 in the YZ cross section includes a region 18. The region 18 is defined by the position of the virtual camera 14, the reference line of sight 16, and the YZ cross section of the virtual space 11. The processor 210 defines a range of a polar angle α from the reference line of sight 16 serving as the center in the virtual space as the region 18.

In FIG. 7, the field-of-view region 15 in the XZ cross section includes a region 19. The region 19 is defined by the position of the virtual camera 14, the reference line of sight 16, and the XZ cross section of the virtual space 11. The processor 210 defines a range of an azimuth β from the reference line of sight 16 serving as the center in the virtual space 11 as the region 19. The polar angle α and β are determined in accordance with the position of the virtual camera 14 and the inclination (direction) of the virtual camera 14.

In at least one aspect, the system 100 causes the monitor 130 to display a field-of-view image 17 based on the signal from the computer 200, to thereby provide the field of view in the virtual space 11 to the user 5. The field-of-view image 17 corresponds to a part of the panorama image 13, which corresponds to the field-of-view region 15. When the user 5 moves the HMD 120 worn on his or her head, the virtual camera 14 is also moved in synchronization with the movement. As a result, the position of the field-of-view region 15 in the virtual space 11 is changed. With this, the field-of-view image 17 displayed on the monitor 130 is updated to an image of the panorama image 13, which is superimposed on the field-of-view region 15 synchronized with a direction in which the user 5 faces in the virtual space 11. The user 5 can visually recognize a desired direction in the virtual space 11.

In this way, the inclination of the virtual camera 14 corresponds to the line of sight of the user 5 (reference line of sight 16) in the virtual space 11, and the position at which the virtual camera 14 is arranged corresponds to the point of view of the user 5 in the virtual space 11. Therefore, through the change of the position or inclination of the virtual camera 14, the image to be displayed on the monitor 130 is updated, and the field of view of the user 5 is moved.

While the user 5 is wearing the HMD 120 (having a non-transmissive monitor 130), the user 5 can visually recognize only the panorama image 13 developed in the virtual space 11 without visually recognizing the real world. Therefore, the system 100 provides a high sense of immersion in the virtual space 11 to the user 5.

In at least one aspect, the processor 210 moves the virtual camera 14 in the virtual space 11 in synchronization with the movement in the real space of the user 5 wearing the HMD 120. In this case, the processor 210 identifies an image region to be projected on the monitor 130 of the HMD 120 (field-of-view region 15) based on the position and the direction of the virtual camera 14 in the virtual space 11.

In at least one aspect, the virtual camera 14 includes two virtual cameras, that is, a virtual camera for providing a right-eye image and a virtual camera for providing a left-eye image. An appropriate parallax is set for the two virtual cameras so that the user 5 is able to recognize the three-dimensional virtual space 11. In at least one aspect, the virtual camera 14 is implemented by a single virtual camera. In this case, a right-eye image and a left-eye image may be generated from an image acquired by the single virtual camera. In at least one embodiment, the virtual camera 14 is assumed to include two virtual cameras, and the roll axes of the two virtual cameras are synthesized so that the generated roll axis (w) is adapted to the roll axis (w) of the HMD 120.

Controller

Figure 8A:
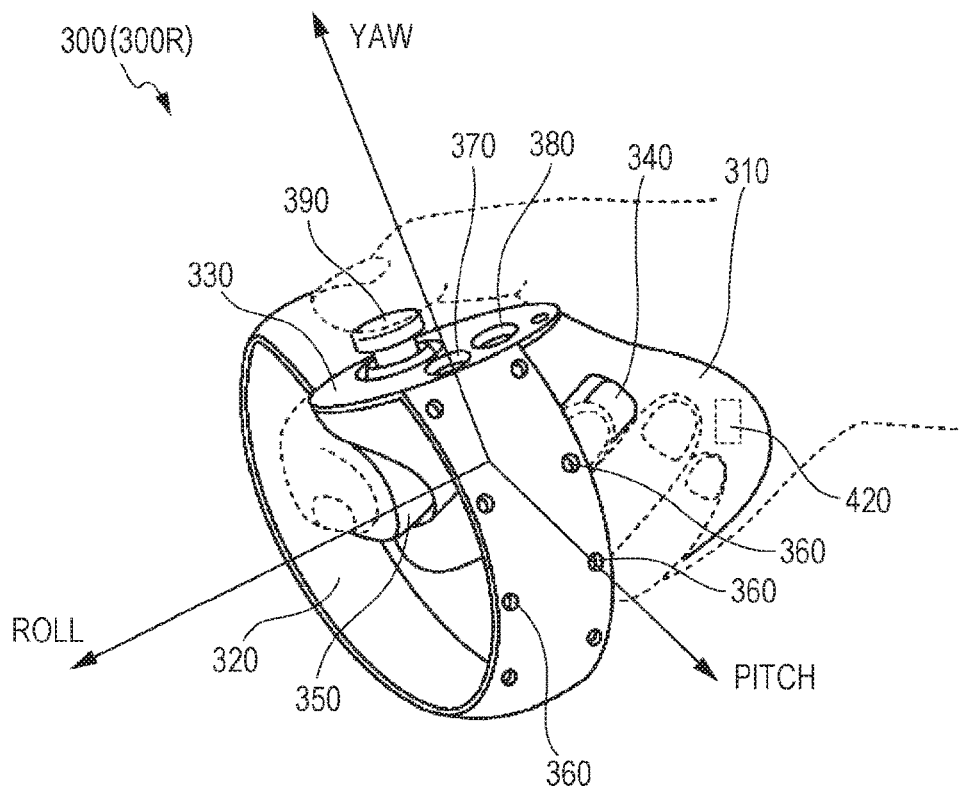
FIG. 8A A diagram of a schematic configuration of a controller according to at least one embodiment of this disclosure.
Figure 8B:
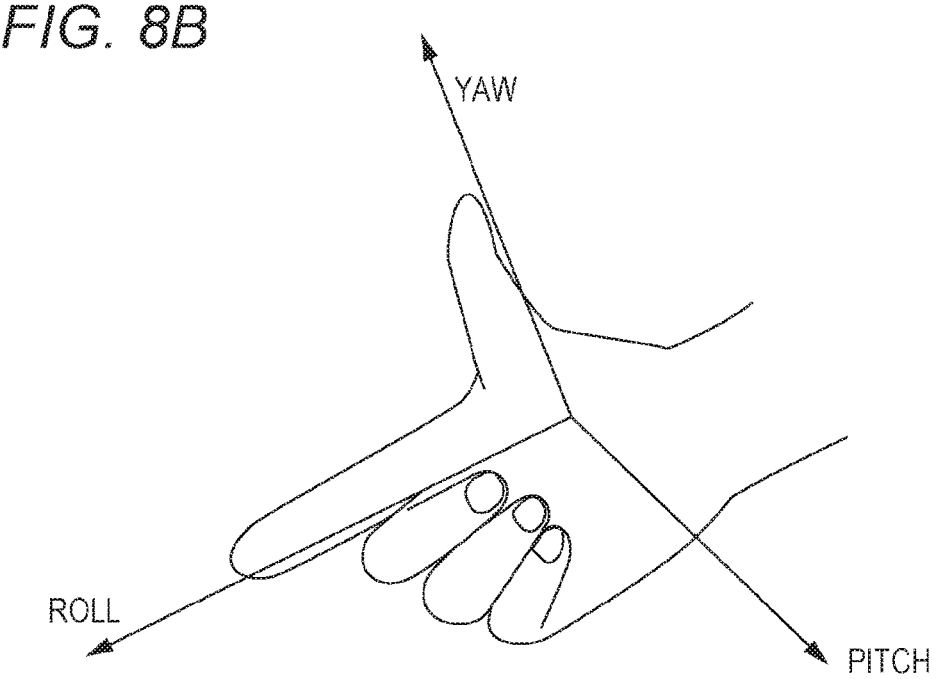
FIG. 8B A diagram of a coordinate system to be set for a hand of a user holding the controller according to at least one embodiment of this disclosure.

An example of the controller 300 is described with reference to FIG. 8A and FIG. 8B. FIG. 8A is a diagram of a schematic configuration of a controller according to at least one embodiment of this disclosure. FIG. 8B is a diagram of a coordinate system to be set for a hand of a user holding the controller according to at least one embodiment of this disclosure.

In at least one aspect, the controller 300 includes a right controller 300R and a left controller (not shown). In FIG. 8A only right controller 300R is shown for the sake of clarity. The right controller 300R is operable by the right hand of the user 5. The left controller is operable by the left hand of the user 5. In at least one aspect, the right controller 300R and the left controller are symmetrically configured as separate devices. Therefore, the user 5 can freely move his or her right hand holding the right controller 300R and his or her left hand holding the left controller. In at least one aspect, the controller 300 may be an integrated controller configured to receive an operation performed by both the right and left hands of the user 5. The right controller 300R is now described.

The right controller 300R includes a grip 310, a frame 320, and a top surface 330. The grip 310 is configured so as to be held by the right hand of the user 5. For example, the grip 310 may be held by the palm and three fingers (e.g., middle finger, ring finger, and small finger) of the right hand of the user 5.

The grip 310 includes buttons 340 and 350 and the motion sensor 420. The button 340 is arranged on a side surface of the grip 310, and receives an operation performed by, for example, the middle finger of the right hand. The button 350 is arranged on a front surface of the grip 310, and receives an operation performed by, for example, the index finger of the right hand. In at least one aspect, the buttons 340 and 350 are configured as trigger type buttons. The motion sensor 420 is built into the casing of the grip 310. When a motion of the user 5 can be detected from the surroundings of the user 5 by a camera or other device. In at least one embodiment, the grip 310 does not include the motion sensor 420.

The frame 320 includes a plurality of infrared LEDs 360 arranged in a circumferential direction of the frame 320. The infrared LEDs 360 emit, during execution of a program using the controller 300, infrared rays in accordance with progress of the program. The infrared rays emitted from the infrared LEDs 360 are usable to independently detect the position and the posture (inclination and direction) of each of the right controller 30R and the left controller. In FIG. 8A, the infrared LEDs 360 are shown as being arranged in two rows, but the number of arrangement rows is not limited to that illustrated in FIG. 8. In at least one embodiment, the infrared LEDs 360 are arranged in one row or in three or more rows. In at least one embodiment, the infrared LEDs 360 are arranged in a pattern other than rows.

The top surface 330 includes buttons 370 and 380 and an analog stick 390. The buttons 370 and 380 are configured as push type buttons. The buttons 370 and 380 receive an operation performed by the thumb of the right hand of the user 5. In at least one aspect, the analog stick 390 receives an operation performed in any direction of 360 degrees from an initial position (neutral position). The operation includes, for example, an operation for moving an object arranged in the virtual space 11.

In at least one aspect, each of the right controller 300R and the left controller includes a battery for driving the infrared ray LEDs 360 and other members. The battery includes, for example, a rechargeable battery, a button battery, a dry battery, but the battery is not limited thereto. In at least one aspect, the right controller 300R and the left controller are connectable to, for example, a USB interface of the computer 200. In at least one embodiment, the right controller 300R and the left controller do not include a battery.

In FIG. 8A and FIG. 8B, for example, a yaw direction, a roll direction, and a pitch direction are defined with respect to the right hand of the user 5. A direction of an extended thumb is defined as the yaw direction, a direction of an extended index finger is defined as the roll direction, and a direction perpendicular to a plane is defined as the pitch direction.

Hardware Configuration of Server

Figure 9:
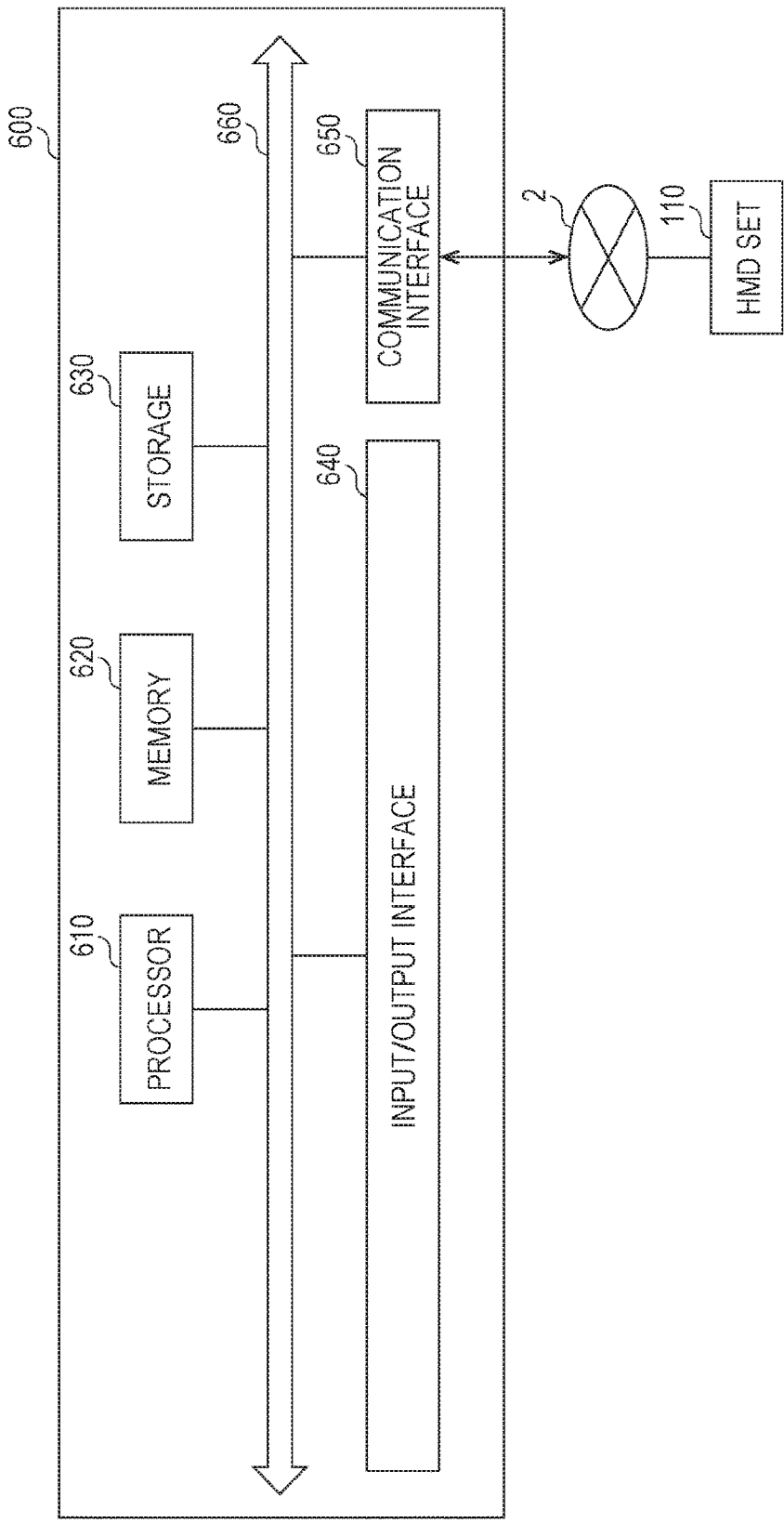
FIG. 9 A block diagram of a hardware configuration of a server according to at least one embodiment of this disclosure.

With reference to FIG. 9, the server 600 in at least one embodiment is described. FIG. 9 is a block diagram of a hardware configuration of the server 600 according to at least one embodiment of this disclosure. The server 600 includes a processor 610, a memory 620, a storage 630, an input/output interface 640, and a communication interface 650. Each component is connected to a bus 660. In at least one embodiment, at least one of the processor 610, the memory 620, the storage 630, the input/output interface 640 or the communication interface 650 is part of a separate structure and communicates with other components of server 600 through a communication path other than the bus 660.

The processor 610 executes a series of commands included in a program stored in the memory 620 or the storage 630 based on a signal transmitted to the server 600 or on satisfaction of a condition determined in advance. In at least one aspect, the processor 610 is implemented as a central processing unit (CPU), a graphics processing unit (GPU), a micro processing unit (MPU), a field-programmable gate array (FPGA), or other devices.

The memory 620 temporarily stores programs and data. The programs are loaded from, for example, the storage 630. The data includes data input to the server 600 and data generated by the processor 610. In at least one aspect, the memory 620 is implemented as a random access memory (RAM) or other volatile memories.

The storage 630 permanently stores programs and data. In at least one embodiment, the storage 630 stores programs and data for a period of time longer than the memory 620, but not permanently. The storage 630 is implemented as, for example, a read-only memory (ROM), a hard disk device, a flash memory, or other non-volatile storage devices. The programs stored in the storage 630 include programs for providing a virtual space in the system 100, simulation programs, game programs, user authentication programs, and programs for implementing communication to/from other computers 200 or servers 600. The data stored in the storage 630 may include, for example, data and objects for defining the virtual space.

In at least one aspect, the storage 630 is implemented as a removable storage device like a memory card. In at least one aspect, a configuration that uses programs and data stored in an external storage device is used instead of the storage 630 built into the server 600. With such a configuration, for example, in a situation in which a plurality of HMD systems 100 are used, for example, as in an amusement facility, the programs and the data are collectively updated.

The input/output interface 640 allows communication of signals to/from an input/output device. In at least one aspect, the input/output interface 640 is implemented with use of a USB, a DVI, an HDMI, or other terminals. The input/output interface 640 is not limited to the specific examples described above.

The communication interface 650 is connected to the network 2 to communicate to/from the computer 200 connected to the network 2. In at least one aspect, the communication interface 650 is implemented as, for example, a LAN, other wired communication interfaces, Wi-Fi, Bluetooth, NFC, or other wireless communication interfaces. The communication interface 650 is not limited to the specific examples described above.

In at least one aspect, the processor 610 accesses the storage 630 and loads one or more programs stored in the storage 630 to the memory 620 to execute a series of commands included in the program. In at least one embodiment, the one or more programs include, for example, an operating system of the server 600, an application program for providing a virtual space, and game software that can be executed in the virtual space. In at least one embodiment, the processor 610 transmits a signal for providing a virtual space to the HMD device 110 to the computer 200 via the input/output interface 640.

Control Device of HMD

Figure 10:
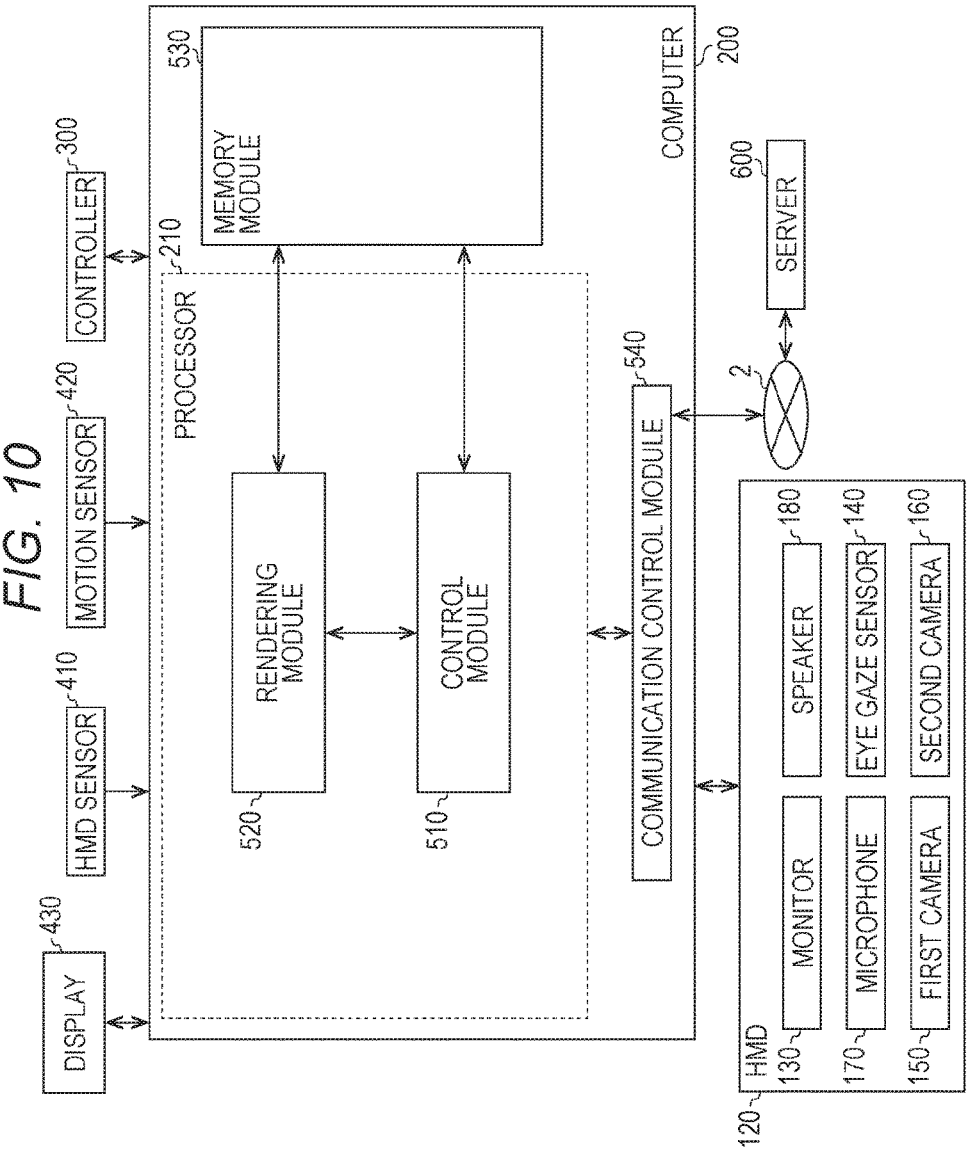
FIG. 10 A block diagram of a computer according to at least one embodiment of this disclosure.

With reference to FIG. 10, the control device of the HMD 120 is described. According to at least one embodiment of this disclosure, the control device is implemented by the computer 200 having a known configuration. FIG. 10 is a block diagram of the computer 200 according to at least one embodiment of this disclosure. FIG. 10 includes a module configuration of the computer 200.

In FIG. 10, the computer 200 includes a control module 510, a rendering module 520, a memory module 530, and a communication control module 540. In at least one aspect, the control module 510 and the rendering module 520 are implemented by the processor 210. In at least one aspect, a plurality of processors 210 function as the control module 510 and the rendering module 520. The memory module 530 is implemented by the memory 220 or the storage 230. The communication control module 540 is implemented by the communication interface 250.

The control module 510 controls the virtual space 11 provided to the user 5. The control module 510 defines the virtual space 11 in the HMD system 100 using virtual space data representing the virtual space 11. The virtual space data is stored in, for example, the memory module 530. In at least one embodiment, the control module 510 generates virtual space data. In at least one embodiment, the control module 510 acquires virtual space data from, for example, the server 600.

The control module 510 arranges objects in the virtual space 11 using object data representing objects. The object data is stored in, for example, the memory module 530. In at least one embodiment, the control module 510 generates virtual space data. In at least one embodiment, the control module 510 acquires virtual space data from, for example, the server 600. In at least one embodiment, the objects include, for example, an avatar object of the user 5, character objects, operation objects, for example, a virtual hand to be operated by the controller 300, and forests, mountains, other landscapes, streetscapes, or animals to be arranged in accordance with the progression of the story of the game.

The control module 510 arranges an avatar object of the user 5 of another computer 200, which is connected via the network 2, in the virtual space 11. In at least one aspect, the control module 510 arranges an avatar object of the user 5 in the virtual space 11. In at least one aspect, the control module 510 arranges an avatar object simulating the user 5 in the virtual space 11 based on an image including the user 5. In at least one aspect, the control module 510 arranges an avatar object in the virtual space 11, which is selected by the user 5 from among a plurality of types of avatar objects (e.g., objects simulating animals or objects of deformed humans).

The control module 510 identifies an inclination of the HMD 120 based on output of the HMD sensor 410. In at least one aspect, the control module 510 identifies an inclination of the HMD 120 based on output of the sensor 190 functioning as a motion sensor. The control module 510 detects parts (e.g., mouth, eyes, and eyebrows) forming the face of the user 5 from a face image of the user 5 generated by the first camera 150 and the second camera 160. The control module 510 detects a motion (shape) of each detected part.

The control module 510 detects a line of sight of the user 5 in the virtual space 11 based on a signal from the eye gaze sensor 140. The control module 510 detects a point-of-view position (coordinate values in the XYZ coordinate system) at which the detected line of sight of the user 5 and the celestial sphere of the virtual space 11 intersect with each other. More specifically, the control module 510 detects the point-of-view position based on the line of sight of the user 5 defined in the uvw coordinate system and the position and the inclination of the virtual camera 14. The control module 510 transmits the detected point-of-view position to the server 600. In at least one aspect, the control module 510 is configured to transmit line-of-sight information representing the line of sight of the user 5 to the server 600. In such a case, the control module 510 may calculate the point-of-view position based on the line-of-sight information received by the server 600.

The control module 510 translates a motion of the HMD 120, which is detected by the HMD sensor 410, in an avatar object. For example, the control module 510 detects inclination of the HMD 120, and arranges the avatar object in an inclined manner. The control module 510 translates the detected motion of face parts in a face of the avatar object arranged in the virtual space 11. The control module 510 receives line-of-sight information of another user 5 from the server 600, and translates the line-of-sight information in the line of sight of the avatar object of another user 5. In at least one aspect, the control module 510 translates a motion of the controller 300 in an avatar object and an operation object. In this case, the controller 300 includes, for example, a motion sensor, an acceleration sensor, or a plurality of light emitting elements (e.g., infrared LEDs) for detecting a motion of the controller 300.

The control module 510 arranges, in the virtual space 11, an operation object for receiving an operation by the user 5 in the virtual space 11. The user 5 operates the operation object to, for example, operate an object arranged in the virtual space 11. In at least one aspect, the operation object includes, for example, a hand object serving as a virtual hand corresponding to a hand of the user 5. In at least one aspect, the control module 510 moves the hand object in the virtual space 11 so that the hand object moves in association with a motion of the hand of the user 5 in the real space based on output of the motion sensor 420. In at least one aspect, the operation object may correspond to a hand part of an avatar object.

When one object arranged in the virtual space 11 collides with another object, the control module 510 detects the collision. The control module 510 is able to detect, for example, a timing at which a collision area of one object and a collision area of another object have touched with each other, and performs predetermined processing in response to the detected timing. In at least one embodiment, the control module 510 detects a timing at which an object and another object, which have been in contact with each other, have moved away from each other, and performs predetermined processing in response to the detected timing. In at least one embodiment, the control module 510 detects a state in which an object and another object are in contact with each other. For example, when an operation object touches another object, the control module 510 detects the fact that the operation object has touched the other object, and performs predetermined processing.

In at least one aspect, the control module 510 controls image display of the HMD 120 on the monitor 130. For example, the control module 510 arranges the virtual camera 14 in the virtual space 11. The control module 510 controls the position of the virtual camera 14 and the inclination (direction) of the virtual camera 14 in the virtual space 11. The control module 510 defines the field-of-view region 15 depending on an inclination of the head of the user 5 wearing the HMD 120 and the position of the virtual camera 14. The rendering module 520 generates the field-of-view region 17 to be displayed on the monitor 130 based on the determined field-of-view region 15. The communication control module 540 outputs the field-of-view region 17 generated by the rendering module 520 to the HMD 120.

The control module 510, which has detected an utterance of the user 5 using the microphone 170 from the HMD 120, identifies the computer 200 to which voice data corresponding to the utterance is to be transmitted. The voice data is transmitted to the computer 200 identified by the control module 510. The control module 510, which has received voice data from the computer 200 of another user via the network 2, outputs audio information (utterances) corresponding to the voice data from the speaker 180.

The memory module 530 holds data to be used to provide the virtual space 11 to the user 5 by the computer 200. In at least one aspect, the memory module 530 stores space information, object information, and user information.

The space information stores one or more templates defined to provide the virtual space 11.

The object information stores a plurality of panorama images 13 forming the virtual space 11 and object data for arranging objects in the virtual space 11. In at least one embodiment, the panorama image 13 contains a still image and/or a moving image. In at least one embodiment, the panorama image 13 contains an image in a non-real space and/or an image in the real space. An example of the image in a non-real space is an image generated by computer graphics.

The user information stores a user ID for identifying the user 5. The user ID is, for example, an internet protocol (IP) address or a media access control (MAC) address set to the computer 200 used by the user. In at least one aspect, the user ID is set by the user. The user information stores, for example, a program for causing the computer 200 to function as the control device of the HMD system 100.

The data and programs stored in the memory module 530 are input by the user 5 of the HMD 120. Alternatively, the processor 210 downloads the programs or data from a computer (e.g., server 600) that is managed by a business operator providing the content, and stores the downloaded programs or data in the memory module 530.

In at least one embodiment, the communication control module 540 communicates to/from the server 600 or other information communication devices via the network 2.

In at least one aspect, the control module 510 and the rendering module 520 are implemented with use of, for example, Unity® provided by Unity Technologies. In at least one aspect, the control module 510 and the rendering module 520 are implemented by combining the circuit elements for implementing each step of processing.

The processing performed in the computer 200 is implemented by hardware and software executed by the processor 410. In at least one embodiment, the software is stored in advance on a hard disk or other memory module 530. In at least one embodiment, the software is stored on a CD-ROM or other computer-readable non-volatile data recording media, and distributed as a program product. In at least one embodiment, the software may is provided as a program product that is downloadable by an information provider connected to the Internet or other networks. Such software is read from the data recording medium by an optical disc drive device or other data reading devices, or is downloaded from the server 600 or other computers via the communication control module 540 and then temporarily stored in a storage module. The software is read from the storage module by the processor 210, and is stored in a RAM in a format of an executable program. The processor 210 executes the program.

Control Structure of HMD System

Figure 11:
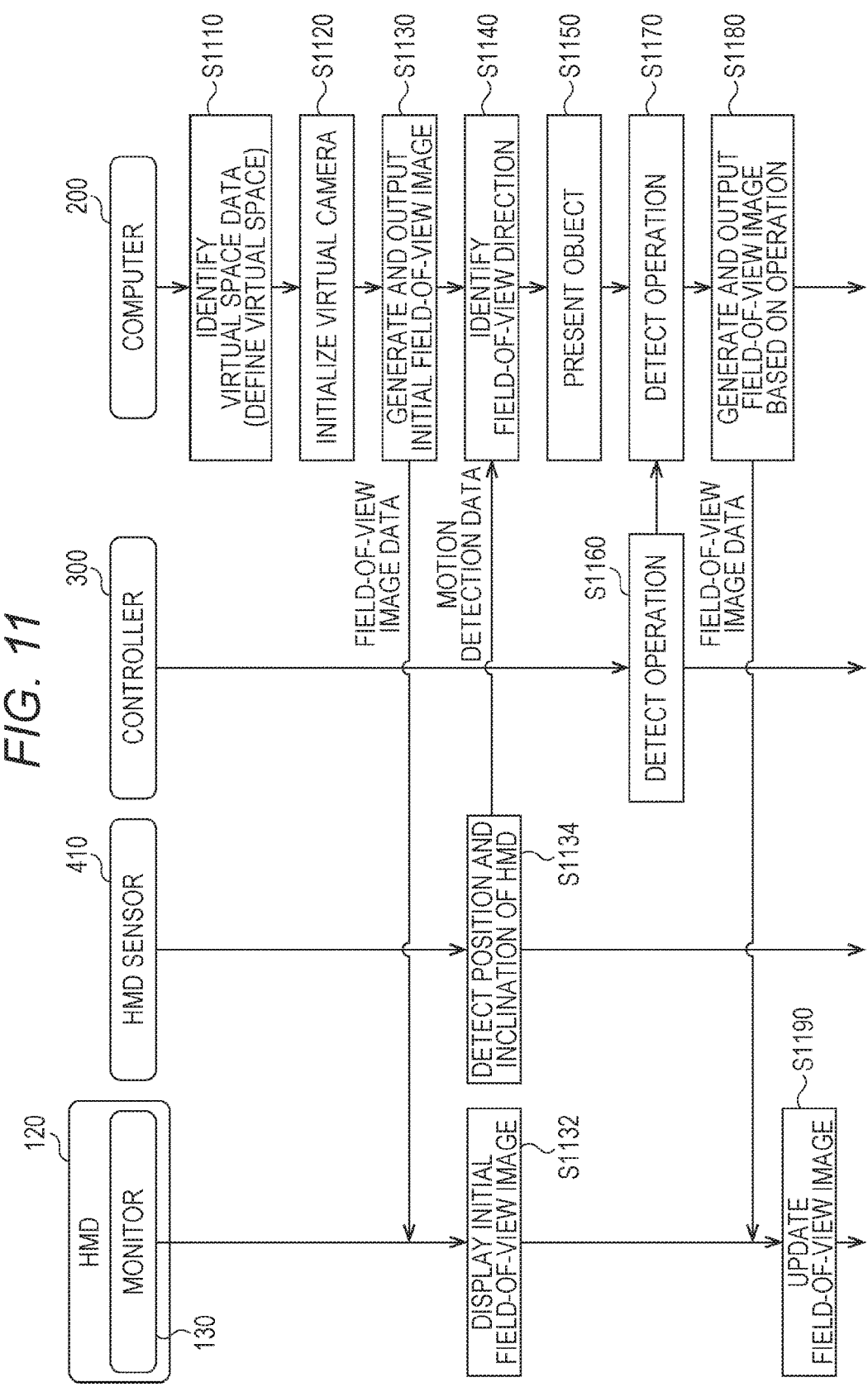
FIG. 11 A sequence chart of processing to be executed by a system including an HMD set according to at least one embodiment of this disclosure.

With reference to FIG. 11, the control structure of the HMD set 110 is described. FIG. 11 is a sequence chart of processing to be executed by the system 100 according to at least one embodiment of this disclosure.

In FIG. 11, in Step S1110, the processor 210 of the computer 200 serves as the control module 510 to identify virtual space data and define the virtual space 11.

In Step S1120, the processor 210 initializes the virtual camera 14. For example, in a work area of the memory, the processor 210 arranges the virtual camera 14 at the center 12 defined in advance in the virtual space 11, and matches the line of sight of the virtual camera 14 with the direction in which the user 5 faces.

In Step S1130, the processor 210 serves as the rendering module 520 to generate field-of-view image data for displaying an initial field-of-view image. The generated field-of-view image data is output to the HMD 120 by the communication control module 540.

In Step S1132, the monitor 130 of the HMD 120 displays the field-of-view image based on the field-of-view image data received from the computer 200. The user 5 wearing the HMD 120 is able to recognize the virtual space 11 through visual recognition of the field-of-view image.

In Step S1134, the HMD sensor 410 detects the position and the inclination of the HMD 120 based on a plurality of infrared rays emitted from the HMD 120. The detection results are output to the computer 200 as motion detection data.

In Step S1140, the processor 210 identifies a field-of-view direction of the user 5 wearing the HMD 120 based on the position and inclination contained in the motion detection data of the HMD 120.

In Step S1150, the processor 210 executes an application program, and arranges an object in the virtual space 11 based on a command contained in the application program.

In Step S1160, the controller 300 detects an operation by the user 5 based on a signal output from the motion sensor 420, and outputs detection data representing the detected operation to the computer 200. In at least one aspect, an operation of the controller 300 by the user 5 is detected based on an image from a camera arranged around the user 5.

In Step S1170, the processor 210 detects an operation of the controller 300 by the user 5 based on the detection data acquired from the controller 300.

In Step S1180, the processor 210 generates field-of-view image data based on the operation of the controller 300 by the user 5. The communication control module 540 outputs the generated field-of-view image data to the HMD 120.

In Step S1190, the HMD 120 updates a field-of-view image based on the received field-of-view image data, and displays the updated field-of-view image on the monitor 130.

Avatar Object

Figure 12A:
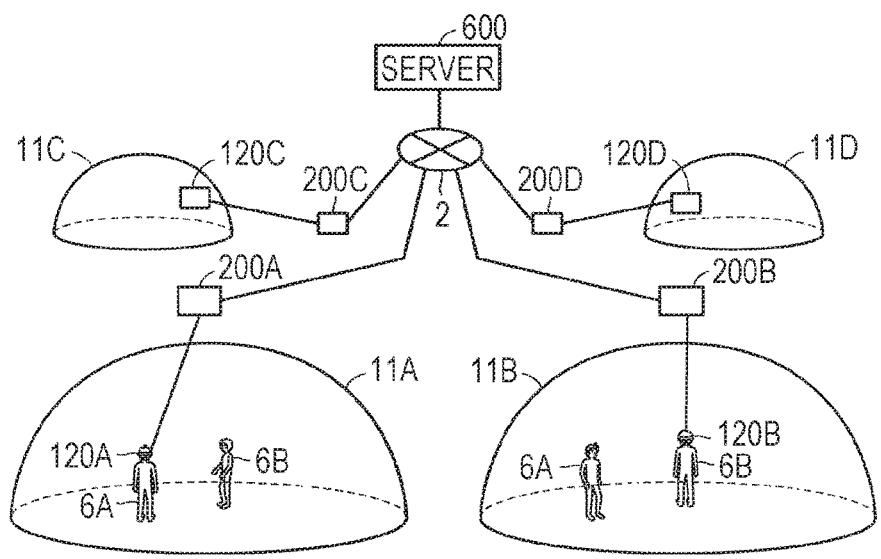
FIG. 12A A schematic diagram of HMD systems of several users sharing the virtual space interact using a network according to at least one embodiment of this disclosure.
Figure 12B:
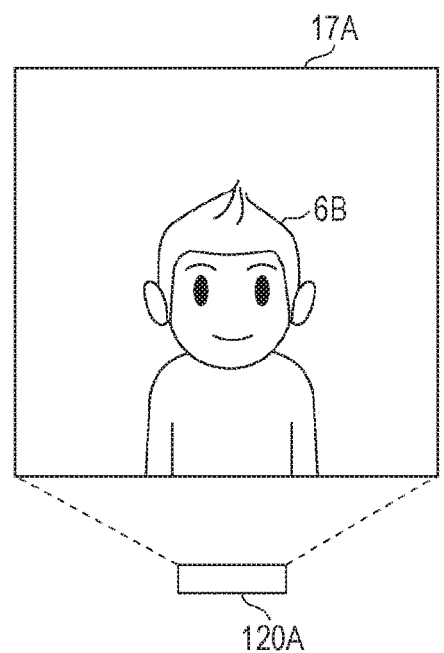
FIG. 12B A diagram of a field of view image of a HMD according to at least one embodiment of this disclosure.

With reference to FIG. 12A and FIG. 12B, an avatar object according to at least one embodiment is described. FIG. 12 and FIG. 12B are diagrams of avatar objects of respective users 5 of the HMD sets 110A and 110B. In the following, the user of the HMD set 110A, the user of the HMD set 110B, the user of the HMD set 110C, and the user of the HMD set 110D are referred to as "user 5A", "user 5B", "user 5C", and "user 5D", respectively. A reference numeral of each component related to the HMD set 110A, a reference numeral of each component related to the HMD set 110B, a reference numeral of each component related to the HMD set 110C, and a reference numeral of each component related to the HMD set 110D are appended by A, B, C, and D, respectively. For example, the HMD 120A is included in the HMD set 110A.

FIG. 12A is a schematic diagram of HMD systems of several users sharing the virtual space interact using a network according to at least one embodiment of this disclosure. Each HMD 120 provides the user 5 with the virtual space 11. Computers 200A to 200D provide the users 5A to 5D with virtual spaces 11A to 11D via HMDs 120A to 120D, respectively. In FIG. 12A, the virtual space 11A and the virtual space 11B are formed by the same data. In other words, the computer 200A and the computer 200B share the same virtual space. An avatar object 6A of the user 5A and an avatar object 6B of the user 5B are present in the virtual space 11A and the virtual space 11B. The avatar object 6A in the virtual space 11A and the avatar object 6B in the virtual space 11B each wear the HMD 120. However, the inclusion of the HMD 120A and HMD 120B is only for the sake of simplicity of description, and the avatars do not wear the HMD 120A and HMD 120B in the virtual spaces 11A and 11B, respectively.

In at least one aspect, the processor 210A arranges a virtual camera 14A for photographing a field-of-view region 17A of the user 5A at the position of eyes of the avatar object 6A.

FIG. 12B is a diagram of a field of view of a HMD according to at least one embodiment of this disclosure. FIG. 12(B) corresponds to the field-of-view region 17A of the user 5A in FIG. 12A. The field-of-view region 17A is an image displayed on a monitor 130A of the HMD 120A. This field-of-view region 17A is an image generated by the virtual camera 14A. The avatar object 6B of the user 5B is displayed in the field-of-view region 17A. Although not included in FIG. 12B, the avatar object 6A of the user 5A is displayed in the field-of-view image of the user 5B.

In the arrangement in FIG. 12B, the user 5A can communicate to/from the user 5B via the virtual space 11A through conversation. More specifically, voices of the user 5A acquired by a microphone 170A are transmitted to the HMD 120B of the user 5B via the server 600 and output from a speaker 180B provided on the HMD 120B. Voices of the user 5B are transmitted to the HMD 120A of the user 5A via the server 600, and output from a speaker 180A provided on the HMD 120A.

The processor 210A translates an operation by the user 5B (operation of HMD 120B and operation of controller 300B) in the avatar object 6B arranged in the virtual space 11A. With this, the user 5A is able to recognize the operation by the user 5B through the avatar object 6B.

Figure 13:
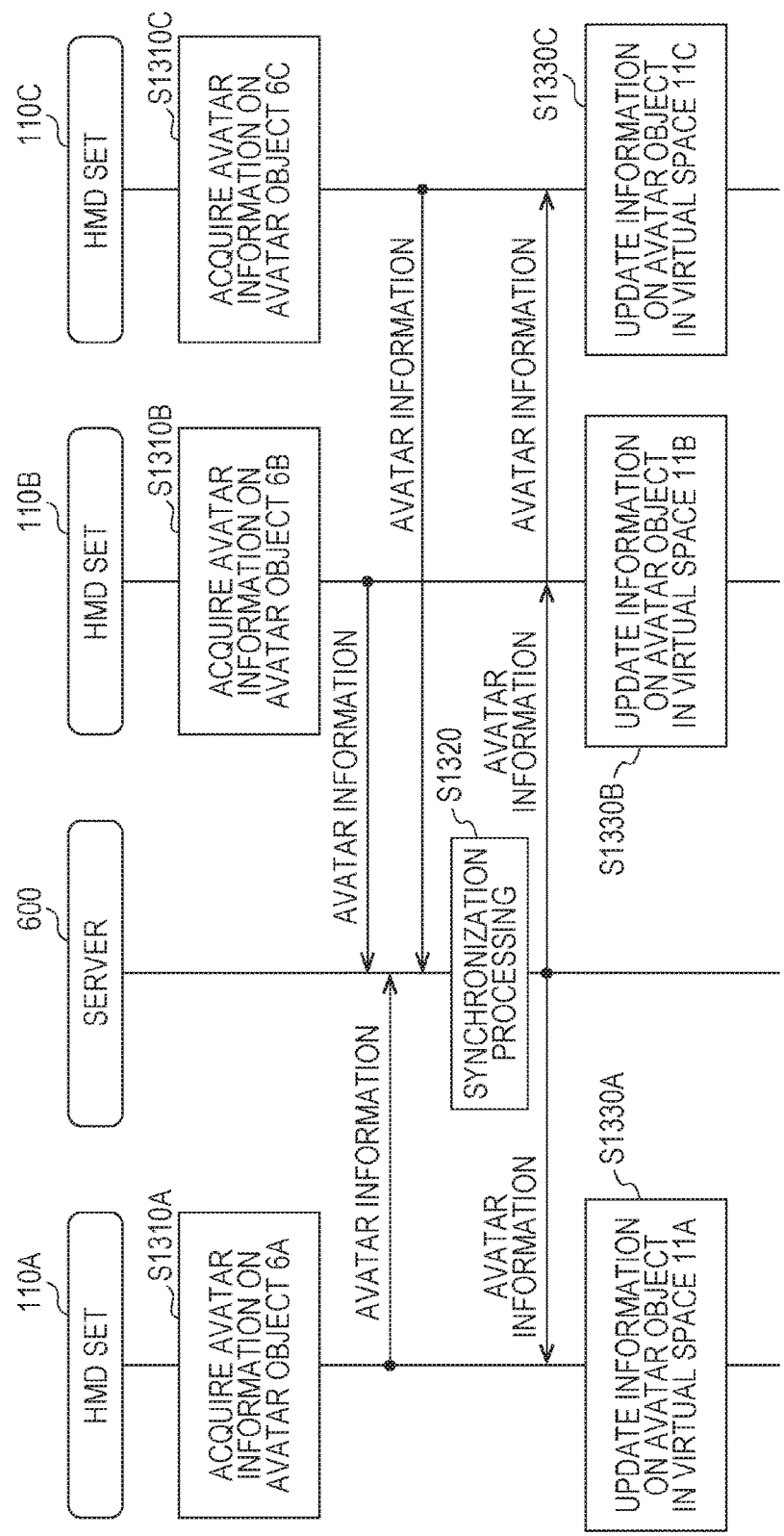
FIG. 13 A sequence diagram of processing to be executed by a system including an HMD interacting in a network according to at least one embodiment of this disclosure.

FIG. 13 is a sequence chart of processing to be executed by the system 100 according to at least one embodiment of this disclosure. In FIG. 13, although the HMD set 110D is not included, the HMD set 110D operates in a similar manner as the HMD sets 110A, 110B, and 110C. Also in the following description, a reference numeral of each component related to the HMD set 110A, a reference numeral of each component related to the HMD set 110B, a reference numeral of each component related to the HMD set 110C, and a reference numeral of each component related to the HMD set 110D are appended by A, B, C, and D, respectively.

In Step S1310A, the processor 210A of the HMD set 110A acquires avatar information for determining a motion of the avatar object 6A in the virtual space 11A. This avatar information contains information on an avatar such as motion information, face tracking data, and sound data. The motion information contains, for example, information on a temporal change in position and inclination of the HMD 120A and information on a motion of the hand of the user 5A, which is detected by, for example, a motion sensor 420A. An example of the face tracking data is data identifying the position and size of each part of the face of the user 5A. Another example of the face tracking data is data representing motions of parts forming the face of the user 5A and line-of-sight data. An example of the sound data is data representing sounds of the user 5A acquired by the microphone 170A of the HMD 120A. In at least one embodiment, the avatar information contains information identifying the avatar object 6A or the user 5A associated with the avatar object 6A or information identifying the virtual space 11A accommodating the avatar object 6A. An example of the information identifying the avatar object 6A or the user 5A is a user ID. An example of the information identifying the virtual space 11A accommodating the avatar object 6A is a room ID. The processor 210A transmits the avatar information acquired as described above to the server 600 via the network 2.

In Step S1310B, the processor 210B of the HMD set 110B acquires avatar information for determining a motion of the avatar object 6B in the virtual space 11B, and transmits the avatar information to the server 600, similarly to the processing of Step S1310A. Similarly, in Step S1310C, the processor 210C of the HMD set 110C acquires avatar information for determining a motion of the avatar object 6C in the virtual space 11C, and transmits the avatar information to the server 600.

In Step S1320, the server 600 temporarily stores pieces of player information received from the HMD set 110A, the HMD set 110B, and the HMD set 110C, respectively. The server 600 integrates pieces of avatar information of all the users (in this example, users 5A to 5C) associated with the common virtual space 11 based on, for example, the user IDs and room IDs contained in respective pieces of avatar information. Then, the server 600 transmits the integrated pieces of avatar information to all the users associated with the virtual space 11 at a timing determined in advance. In this manner, synchronization processing is executed. Such synchronization processing enables the HMD set 110A, the HMD set 110B, and the HMD 120C to share mutual avatar information at substantially the same timing.

Next, the HMD sets 110A to 110C execute processing of Step S1330A to Step S1330C, respectively, based on the integrated pieces of avatar information transmitted from the server 600 to the HMD sets 110A to 110C. The processing of Step S1330A corresponds to the processing of Step S1180 of FIG. 11.

In Step S1330A, the processor 210A of the HMD set 110A updates information on the avatar object 6B and the avatar object 6C of the other users 5B and 5C in the virtual space 11A. Specifically, the processor 210A updates, for example, the position and direction of the avatar object 6B in the virtual space 11 based on motion information contained in the avatar information transmitted from the HMD set 110B. For example, the processor 210A updates the information (e.g., position and direction) on the avatar object 6B contained in the object information stored in the memory module 530. Similarly, the processor 210A updates the information (e.g., position and direction) on the avatar object 6C in the virtual space 11 based on motion information contained in the avatar information transmitted from the HMD set 110C.

In Step S1330B, similarly to the processing of Step S1330A, the processor 210B of the HMD set 110B updates information on the avatar object 6A and the avatar object 6C of the users 5A and 5C in the virtual space 11B. Similarly, in Step S1330C, the processor 210C of the HMD set 110C updates information on the avatar object 6A and the avatar object 6B of the users 5A and 5B in the virtual space 11C.

Next, an example of processing of synchronizing motions by the avatar objects 6A and 6B between the HMD set 110A and the HMD set 110B is described with reference to FIG. 14A, FIG. 14B, and FIG. 15. The term avatar object is synonymous with avatar. FIG. 14A is a diagram of the virtual space 11A provided to the user 5A according to at least one embodiment of this disclosure. FIG. 14B is a diagram of the virtual space 11B provided to the user 5B according to at least one embodiment of this disclosure. FIG. 15 is a sequence diagram of an example of processing of synchronizing motions by the avatar objects 6A and 6B between the HMD set 110A and the HMD set 110B according to at least one embodiment of this disclosure. In this description of FIG. 14A and FIG. 14B, the avatar object 6A (first avatar) is associated with the HMD set 110A (user 5A) and the avatar object 6B (second avatar) is associated with the HMD set 110B (user 5B) share the same virtual space. More specifically, the user 5A and the user 5B share one virtual space via the communication network 2.

In FIG. 14A, the virtual space 11A of the user 5A includes the avatar object 6A and the avatar object 6B. The avatar object 6A is operated by the user 5A and moves in association with a motion by the user 5A. The avatar object 6A has a virtual left hand 8A (part of virtual body of avatar object 6A) that moves in association with a motion by the controller 300L of the HMD set 110A, which corresponds to a motion by the left hand of the user 5A, and a virtual right hand 7A (part of virtual body of avatar object 6A) that moves in association with a motion by the controller 300R of the HMD set 110A, which corresponds to a motion by the right hand of user 5A. The avatar object 6B is operated by the user 5B and moves in association with a motion by the user 5B. The avatar object 6B has a virtual left hand 8B (part of virtual body of avatar object 6B) that moves in association with a motion by the controller 300L of the HMD set 110B, which corresponds to a motion by the left hand of the user 5B, and a virtual right hand 7B (part of virtual body of avatar object 6B) that moves in association with a motion by the controller 300R of the HMD set 110B, which corresponds to a motion by the right hand of the user 5B.

In at least one embodiment, the avatar object 6A is not visible in the virtual space 11A provided to the user 5A. In this case, the avatar object 6A arranged in the virtual space 11A includes at least the virtual camera 14 that moves in association with the motion by the HMD 120 of the HMD set 110A.

The positions of the avatar objects 6A and 6B may also be identified in accordance with the positions of the HMDs 120 of the HMD sets 110A and 110B. Similarly, the directions of the faces of the avatar objects 6A and 6B may also be identified in accordance with the inclinations of the HMDs 120 of the HMD sets 110A and 110B. The motions by the virtual hands of the avatar objects 6A and 6B may also be identified in accordance with a motion by an external controller of each of the HMD sets 110A and 110B. In particular, the motions by the virtual left hands of the avatar objects 6A and 6B may be identified in accordance with the motions by the controllers 300L of the HMD sets 110A and 110B, and the motions by the virtual right hands may be identified in accordance with the motion by the avatar objects 6A and 6B in accordance with the motions by the controllers 300R of the HMD sets 110A and 110B. The relative positions of irises and pupils with respect to scleras of the avatar objects 6A and 6B may be identified in accordance with the data representing the lines of sight of the users 5A and 5B detected by the eye gaze sensor 140. In particular, the relative position of the left iris and pupil with respect to the left sclera of the avatar may be identified in accordance with the data representing the line of sight of the left eye of the user detected by a left-eye gaze sensor, and the relative position of the right iris and pupil with respect to the right sclera of the avatar may be identified in accordance with the data representing the line of sight of the right eye of the user detected by a right-eye gaze sensor.

The lines of sight of the avatar objects 6A and 6B may also be identified in accordance with the positions of the HMDs 120 of the HMD sets 110A and 110B. In other words, the line of sight of the avatar may be identified in accordance with a visual axis L of the virtual camera. In this case, the "line of sight of the avatar" is the line of sight of both eyes of the avatar. The lines of sight of the avatar objects 6A and 6B may also be identified based on the inclination of the HMD 120 of each of the HMD sets 110A and 110B and the lines of sight of the users 5A and 5B (lines of sight of both eyes of users 5A and 5B). In this case, the lines of sight of the users 5A and 5B are identified in accordance with the data representing the lines of sight of the users 5A and 5B detected by the eye gaze sensor 140 as described above.

The virtual camera 14 may be arranged in each eye of the avatar objects 6A and 6B. In particular, a left eye virtual camera may be arranged in the left eyes of the avatar objects 6A and 6B, and a right eye virtual camera may be arranged in the right eye of the avatar objects 6A and 6B. In the following description, the virtual camera 14 is arranged in the eyes of the avatar objects 6A and 6B. As a result, in at least one embodiment, a visual-field CV of the avatar object 6A matches a field-of-view region 15 of the virtual camera 14 arranged in the avatar object 6A. Similarly, in at least one embodiment, the visual-field CV of the avatar object 6B matches the field-of-view region 15 of the virtual camera 14 arranged in the avatar object 6B.

In FIG. 14B, the virtual space 11B of the user 5B includes the avatar object 6A and the avatar object 6B. The position of each of the avatar objects 6A and 6B in the virtual space 11A may correspond to the position of each of the avatar objects 6A and 6B in the virtual space 11B.

In at least one embodiment, the avatar object 6B is not visible in the virtual space 11B provided to the user 5B. In this case, the avatar object 6B arranged in the virtual space 11B includes at least the virtual camera 14 that moves in association with the motion by the HMD 120 of the HMD set 110B.

Next, in FIG. 15, in Step S1510, the processor 210 of the HMD set 110A generates the sound data on the user 5A. For example, when the user 5A has input a sound into the microphone 170 (sound input unit) of the HMD set 110A, the microphone 170 generates sound data representing the input sound. Then, the microphone 170 transmits the generated sound data to the processor 210 via the input/output interface 240.

Next, in Step S1511, the processor 210 of the HMD set 110A generates control information on the avatar object 6A, and then transmits the generated control information on the avatar object 6A and the sound data representing the sound of the user 5A (sound data on user 5A) to the server 600. Then, the processor 610 of the server 600 receives the control information on the avatar object 6A and the sound data on the user 5A from the HMD set 110A (Step S1512). In this case, the control information on the avatar object 6A is information required for controlling the motion by the avatar object 6A. The control information on the avatar object 6A includes information on the line of sight (line-of-sight information) of the avatar object 6A. The control information on the avatar object 6A also includes information on the position of the avatar object 6A, information on the direction of the face of the avatar object 6A, information on the virtual hands (virtual left hand and virtual right hand) of the avatar object 6A, and information on the motions by the eyes (in particular, motion of iris and pupil) of the avatar object 6A.

Next, in Step S1513, the processor 210 of the HMD set 110B generates control information on the avatar object 6B, and then transmits the generated control information on the avatar object 6B to the server 600. Then, the processor 610 of the server 600 receives the control information on the avatar object 6B from the HMD set 110B (Step S1514). In this case, the control information on the avatar object 6B is information required for controlling the motion by the avatar object 6B. The control information on the avatar object 6B includes information on the line of sight (line-of-sight information) of the avatar object 6B. The control information on the avatar object 6B also includes information on the position of the avatar object 6B, information on the direction of the face of the avatar object 6B, information on the virtual hands (virtual left hand and virtual right hand) of the avatar object 6B, and information on the motions by the eyes (in particular, motion of iris and pupil) of the avatar object 6B.

Next, the server 600 transmits control information on the avatar object 6B to the HMD set 110A (Step S1515), and transmits the control information on the avatar object 6A and the sound data on the user 5A to the HMD set 110B (Step S1519). Then, in Step S1516, the processor 210 of the HMD set 110A receives the control information on the avatar object 6B, and then updates the virtual space data representing the virtual space 11A (see FIG. 14A) based on the control information on the avatar objects 6A and 6B (Step S1517). For example, when the avatar objects 6A and 6B have moved, virtual space data is generated representing the virtual space including the moved avatar objects 6A and 6B. Then, the processor 210 of the HMD set 110A identifies the visual-field CV of the avatar object 6A (virtual camera 14) in accordance with the position and inclination of the HMD 120, and then updates the field-of-view image displayed on the HMD 120 based on the updated virtual space data and the visual-field CV of the avatar object 6A (Step S1518). The term field-of-view image is synonymous with visual-field image.

Meanwhile, in Step S1520, the processor 210 of the HMD set 110B receives the control information on the avatar object 6A and the sound data on the user 5A, and then updates the virtual space data representing the virtual space 11B (see FIG. 14B) based on the control information on the avatar objects 6A and 6B (Step S1521). Then, the processor 210 of the HMD set 110B identifies the visual-field CV of the avatar object 6B (virtual camera 14) in accordance with the position and inclination of the HMD 120, and then updates the field-of-view image displayed on the HMD 120 based on the updated virtual space data and the visual-field CV of the avatar object 6B (Step S1522).

Then, the processor 210 of the HMD set 110B processes the sound data on user 5A based on the received sound data on the user 5A, the information on the position of the avatar object 6A included in the control information on the avatar object 6A, the information on the position of the avatar object 6B, and a predetermined sound processing algorithm. Then, the processor 210 transmits the processed sound data to the speaker 180 (sound output unit), and the speaker 180 outputs the sound of the user 5A based on the processed sound data (Step S1523). In this way, a sound chat (VR chat) can be implemented between users (between avatars) in the virtual space.

In at least one embodiment of this disclosure, after the HMD sets 110A and 110B have transmitted the control information on the avatar object 6A and the control information on the avatar object 6B, respectively, to the server 600, the server 600 transmits the control information on the avatar object 6A to the HMD set 110B, and transmits the control information on the avatar object 6B to the HMD set 110A. In this way, the motion by each of the avatar objects 6A and 6B can be synchronized between the HMD set 110A and the HMD set 110B.

Figure 16:
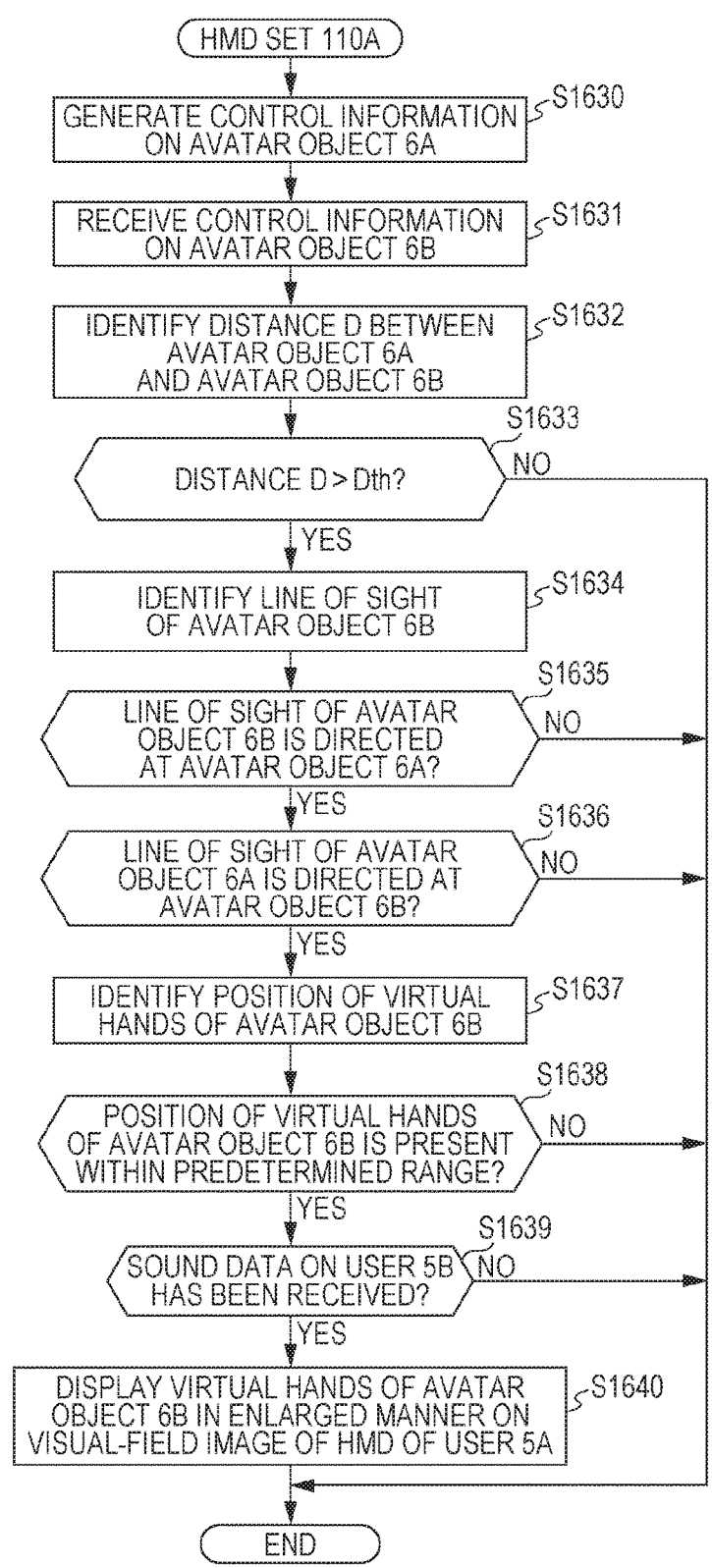
FIG. 16 A flowchart of an information processing method according to at least one embodiment of this disclosure.
Figure 17:
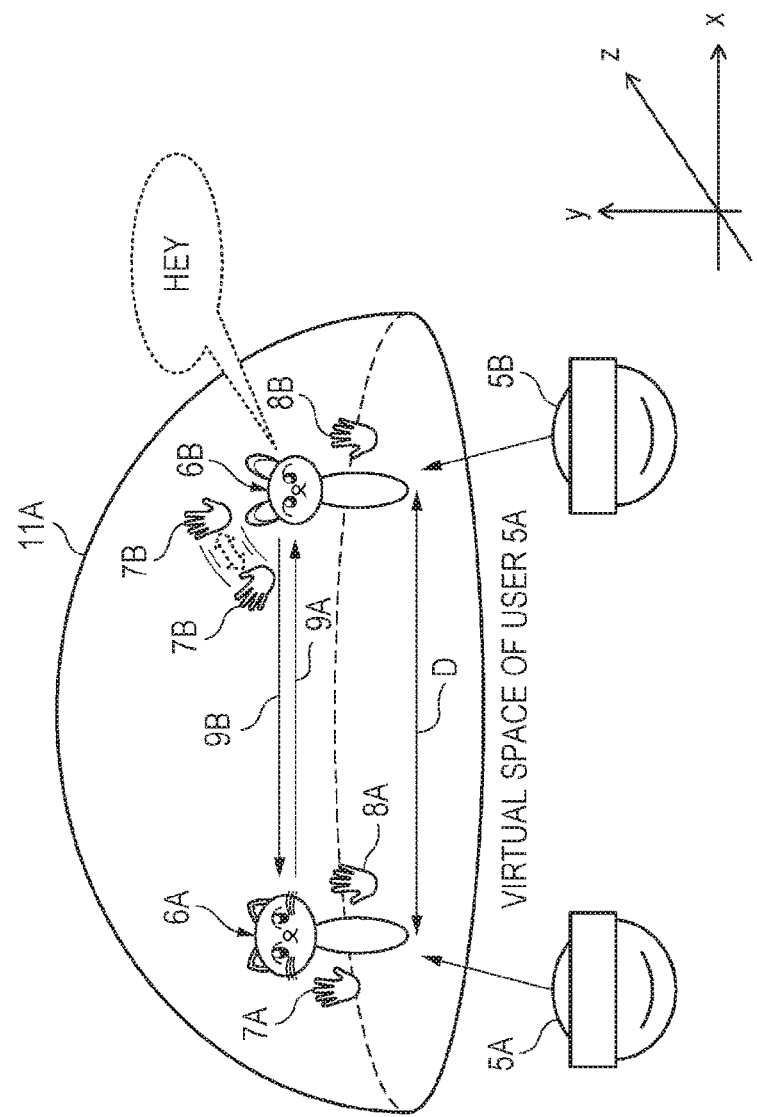
FIG. 17 A diagram of the virtual space provided to the user 5A according to at least one embodiment of this disclosure.

Next, the information processing method according to at least one embodiment of this disclosure is described with reference to FIG. 16 and FIG. 17. FIG. 16 is a flowchart of the information processing method according to at least one embodiment of this disclosure. FIG. 17 is a diagram of the virtual space 11A provided to the user 5A according to at least one embodiment of this disclosure.

In at least one embodiment, in FIG. 17, the avatar object 6A and the avatar object 6B share the same virtual space. Specifically, in at least one embodiment, the users 5A and 5B share one virtual space via the communication network 2.

The virtual space 11A of the user 5A includes the avatar object 6A and the avatar object 6B. The processor 210 of the HMD set 110A generates virtual space data representing the virtual space 11A.

In FIG. 16, in Step S1630, the processor 210 of the HMD set 110A (hereinafter simply referred to as "processor 210") generates the control information on the avatar object 6A required to control the motion by the avatar object 6A. Then, the processor 210 transmits the control information on the avatar object 6A to the server 600. Next, in Step S1631, the processor 210 receives from the server 600 the control information on the avatar object 6B required for controlling the motion by the avatar object 6B. Specifically, the server receives the control information on the avatar object 6B from the HMD set 110B, and then transmits the control information on the avatar object 6B to the HMD set 110A. In this way, the processor 210 receives the control information on the avatar object 6B from the server 600.

Next, the processor 210 identifies the position of the avatar object 6B based on the information on the position of the avatar object 6B included in the received control information on the avatar object 6B. Then, based on the position of the avatar object 6A and the position of the avatar object 6B, the processor 210 calculates a distance D (example of relative positional relationship between avatar object 6A and avatar object 6B) between the avatar object 6A and the avatar object 6B (Step S1632).

Next, the processor 210 determines whether or not the identified distance D is larger than a predetermined distance Dth (Step S1633). The predetermined distance Dth may be appropriately set in accordance with the subject matter of the content. The predetermined distance Dth is an index for determining whether or not the avatar object 6A and the avatar object 6B are sufficiently separated. In response to a determination that the distance D is larger than the predetermined distance Dth (YES in Step S1633), a determination is made that the avatar object 6A is present at a position sufficiently separated from the avatar object 6B, and the processing advances to the processing of Step S1634. On the other hand, in response to a determination that the distance D is equal to or less than the predetermined distance Dth (NO in Step S1633), a determination is made that the avatar object 6A is not present at a position sufficiently separated from the avatar object 6B, and the processing relating to this information processing method ends. The determination condition defined in Step S1633 is a condition relating to the relative positional relationship between the avatar object 6A and the avatar object 6B.

Next, the processor 210 identifies a line of sight 9B of the avatar object 6B (see FIG. 17) based on the line-of-sight information on the avatar object 6B included in the control information on the avatar object 6B (Step S1634). Then, the processor 210 determines whether or not the line of sight 9B of the avatar object 6B is directed at the avatar object 6A (Step S1635). For example, when the line of sight 9B intersects with the virtual body of the avatar object 6A, the processor 210 determines that the line of sight 9B is directed at the avatar object 6A. The determination condition defined in Step S1635 is a condition relating to the line of sight of the avatar object 6B. In response to the determination result of Step S1635 being "YES", the processing advances to the processing of Step S1636. On the other hand, in response to the determination result of Step S1635 being "NO", the processing relating to this information processing method ends.

In Step S1635, the processor 210 may also determine whether or not the line of sight 9B of the avatar object 6B has been directed at the avatar object 6A for longer than a predetermined duration Tth (e.g., X seconds). In this way, by adding a time condition, namely, predetermined duration Tth<time T, to the determination condition defined in Step S1635, a reliable determination is made regarding whether or not the line of sight of the avatar object 6B (user 5B) is being directed at the avatar object 6A (user 5A).

Next, in Step S1636, the processor 210 determines whether or not a line of sight 9A of the avatar object 6A (see FIG. 17) is directed at the avatar object 6B. For example, when the line of sight 9A intersects with the virtual body of the avatar object 6B, the processor 210 determines that the line of sight 9A is directed at the avatar object 6B. The determination condition defined in Step S1636 is a condition relating to the line of sight of avatar object 6A. In response to the determination result of Step S1636 being "YES", the processing advances to the processing of Step S1637. On the other hand, in response to the determination result of Step S1636 being "NO", the processing relating to this information processing method ends. In Step S1636, the processor 210 may also determine whether or not the line of sight 9A of the avatar object 6A has been directed at the avatar object 6B for longer than a predetermined duration Tth (e.g., X seconds).

Next, in Step S1637, the processor 210 identifies the position (x1, y1, z1) of the virtual left hand 8B and the position (x2, y2, z2) of the virtual right hand 7B based on information on the virtual hands (virtual left hand 8B and virtual right hand 7B) of the avatar object 6B (information on part of virtual body of avatar object 6B) included in the control information on the avatar object 6B. Next, in Step S1638, the processor 210 determines whether or not the position y1 of the virtual left hand 8B and the position y2 of the virtual right hand 7B in a y-axis direction (height direction) of the virtual space 11A are present within a predetermined range. In this case, the "predetermined range" may be set as appropriate in accordance with the subject matter of the content. The "predetermined range" is an index for determining whether or not the avatar object 6B is signaling the avatar object 6A by using its virtual hands. For example, in a case where the predetermined range is defined as a range larger than yth1 and smaller than yth2, yth1 and yth2 satisfy 0<yth1<yth2, and that the position y1 of the virtual left hand 8B satisfies yth1>y1, the processor 210 determines that the determination condition defined in Step S1638 is not satisfied. On the other hand, in response to the position y2 of the virtual right hand 7B satisfying yth1<y2<yth2, the processor 210 determines that the determination condition defined in Step S1638 is satisfied. In response to the determination result of Step S1638 being "YES", the processing advances to the processing of Step S1639. On the other hand, in response to the determination result of Step S1638 being "NO", the processing relating to this information processing method ends. The determination condition defined in Step S1638 is a condition relating to the virtual hands of the avatar object 6B. In this example, only the virtual right hand 7B satisfies the determination condition defined in Step S1638, and hence the processing defined in Step S1640 is executed only for the virtual right hand 7B.

Next, in Step S1639, the processor 210 determines whether or not sound data (sound data on user 5B) representing the sound of the user 5B has been received from the server 600. For example, when the user 5B utters "Hey" through the microphone 170 of the HMD set 110B, sound data representing the sound of the user 5B is transmitted from the HMD set 110B to the server 600. Then, the server 600 transmits the sound data on the user 5B to the HMD set 110A. As a result, the processor 210 determines that the HMD set 110A has received the sound data on the user 5B. In response to the determination result of Step S1639 being "YES", the processing advances to the processing of Step S1640. On the other hand, in response to the determination result of Step S1639 being "NO", the processing relating to this information processing method ends.

Next, in Step S1640, the processor 210 displays the virtual right hand 7B of the avatar object 6B in an enlarged manner on a field-of-view image V displayed on the HMD 120 of the HMD set 110A. In other words, in response to a determination by the processor 210 that all the determination conditions of Steps S1633, S1635, S1636, S1638, and S1639 in FIG. 16 are satisfied, the virtual right hand 7B of the avatar object 6B is displayed in an enlarged manner on a field-of-view image 1817.

In this example, only the virtual right hand 7B satisfies the determination condition defined in Step S1638, and hence only the virtual right hand 7B is displayed in an enlarged manner on the field-of-view image 1817. On the other hand, when both the virtual right hand 7B and the virtual left hand 8B satisfy the determination condition defined in Step S1638, both the virtual left hand 8B and the virtual right hand 7B may be displayed in an enlarged manner on the field-of-view image 1817. A method of displaying the virtual right hand 7B in an enlarged manner is now described with reference to FIG. 18 and FIG. 19.

Figure 18:
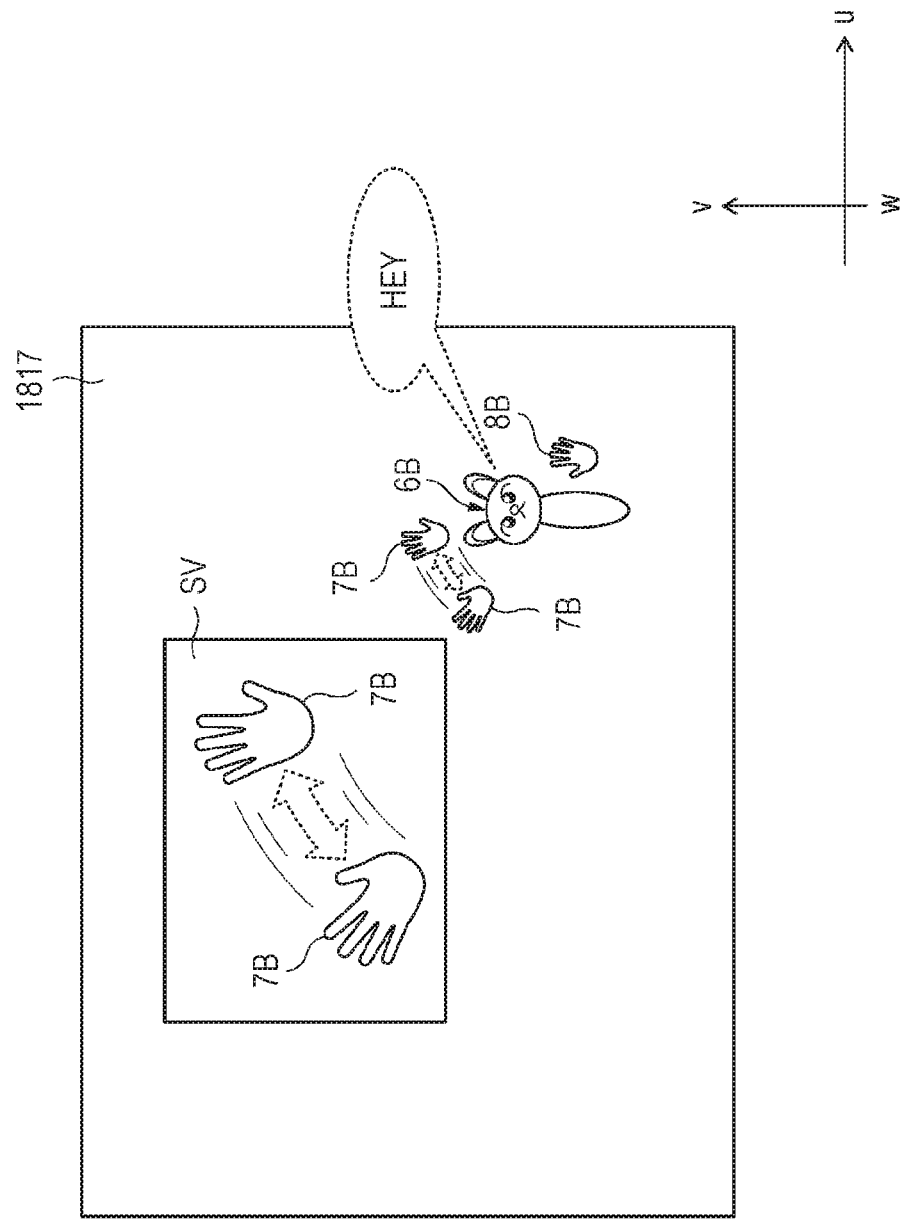
FIG. 18 A diagram of a field-of-view image in which a virtual right hand of an avatar is displayed in an enlarged manner according to at least one embodiment of this disclosure.
Figure 19:
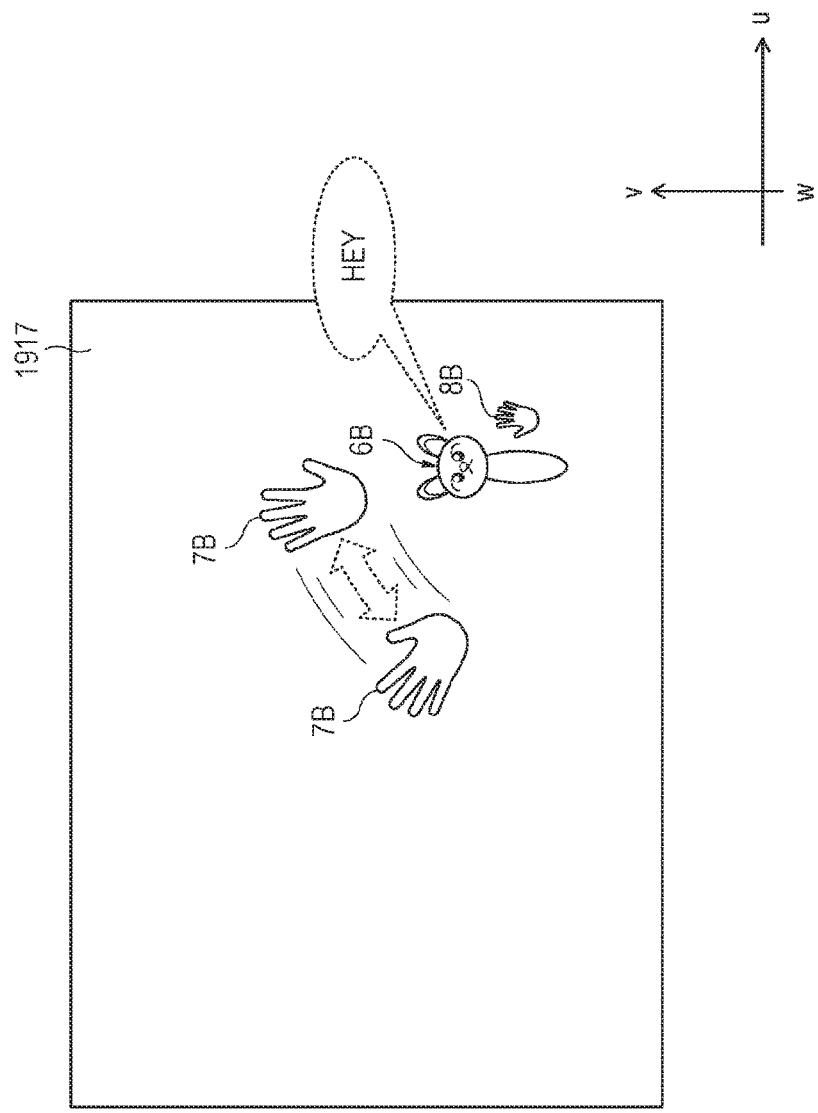
FIG. 19 A diagram of a field-of-view image in which the virtual right hand of the avatar is displayed in an enlarged manner according to at least one embodiment of this disclosure.

FIG. 18 is a diagram of a field-of-view image 1817 in which the virtual right hand 7B of the avatar object 6B is displayed in an enlarged manner according to at least one embodiment of this disclosure. FIG. 19 is a diagram of a field-of-view image 1917 in which the virtual right hand 7B of the avatar object 6B is displayed in an enlarged manner according to at least one embodiment of this disclosure.

In FIG. 18, a sub-image region SV for displaying the virtual right hand 7B displayed in an enlarged manner may be arranged in the field-of-view image 1817 displayed on the HMD 120 worn by the user 5A. In this case, firstly, the processor 210 updates the visual-field CV of the avatar object 6A in accordance with the motion by the HMD 120, and then updates the field-of-view image 1817 displayed on the HMD 120 based on the visual-field CV and the virtual space data representing the virtual space 11A of the avatar object 6. Then, the processor 210 sets the sub-image region SV in the field-of-view image 1817, and displays in the sub-image region SV the virtual right hand 7B displayed in an enlarged manner. In FIG. 18, the virtual right hand 7B displayed in an enlarged manner moves in the sub-image region SV in accordance with the movement of the virtual right hand 7B of the avatar object 6B displayed on the field-of-view image 1817.

The virtual right hand 7B displayed in an enlarged manner may also be imaged by an auxiliary virtual camera (not shown) arranged near the virtual right hand 7B of the avatar object 6B. In this case, the processor 210 identifies the visual field of the auxiliary virtual camera, and generates auxiliary field-of-view image data based on the visual field of the auxiliary virtual camera and the virtual space data. Then, the processor 210 may display in the sub-image region SV the auxiliary field-of-view image representing the virtual right hand 7B displayed in an enlarged manner based on the generated auxiliary field-of-view image data.

When both the virtual right hand 7B and the virtual left hand 8B are displayed in an enlarged manner on the field-of-view image 1817, a first sub-image region for displaying the virtual right hand 7B displayed in an enlarged manner and a second sub-image region for displaying the virtual left hand 8B displayed in an enlarged manner may be arranged on the field-of-view image 1817. In this case, a first auxiliary virtual camera may be arranged near the virtual right hand 7B of the avatar object 6B and a second auxiliary virtual camera may be arranged near the virtual left hand 8B of the avatar object 6B.

In FIG. 19, the processor 210 may update the avatar object 6B such that the virtual right hand 7B of the avatar object 6B is enlarged, and then display on the HMD 120 of the HMD set 110A the field-of-view image 1917 displaying the updated avatar object 6B. In this way, the virtual right hand 7B displayed in an enlarged manner is displayed on the field-of-view image 1917. FIG. 19 is different from FIG. 18 in that the virtual right hand 7B, which is a part of the virtual body of the avatar object 6B, is enlarged instead of having a sub-image region SV having an enlarged image of the virtual right hand 7B.

In at least one embodiment, in order to execute the processing of Step S1640 for displaying the virtual hands of the avatar object 6B in an enlarged manner, all of the determination conditions defined in Steps S1633, S1635, S1636, S1638, and S1639 are satisfied. In response to a determination that all of those determination conditions are satisfied, the virtual hand (in this example, virtual right hand 7B) of the avatar object 6B is displayed in an enlarged manner on the field-of-view image displayed on the HMD 120 of the HMD set 110A. In this way, the user 5A is able to clearly visually recognize a motion by the virtual right hand 7B of the avatar object 6B (e.g., hand waving motion) by looking at the virtual right hand 7B of the avatar object 6B displayed in an enlarged manner on the field-of-view image. As a result, smooth communication in which body language is used between the avatar object 6A (user 5A) and the avatar object 6B (user 5B) can be achieved. Therefore, a rich virtual experience can be provided to the user.

In at least one embodiment, the determination condition defined in Step S1633 is provided as one of the conditions for determining whether the virtual hands of the avatar object 6B are to be displayed in an enlarged manner. More specifically, in response to the avatar object 6A and the avatar object 6B not being sufficiently separated from each other (D≤Dth), the user 5A is able to clearly visually recognize the virtual hands of the avatar object 6B, and hence the virtual hands of the avatar object 6B are not displayed in an enlarged manner. On the other hand, in response to the avatar object 6A and the avatar object 6B being sufficiently separated from each other (D>Dth), the virtual hands of the avatar object 6B are displayed in an enlarged manner, which enables the user 5A to clearly visually recognize motions by the virtual hands of the avatar object 6B. In this way, even when the avatar object 6A and the avatar object 6B are sufficiently separated from each other, smooth communication in which body language is used between the avatar object 6A and the avatar object 6B can be achieved.

In at least one embodiment, the determination condition defined in Step S1635 is provided as one of the conditions for determining whether the virtual hands of the avatar object 6B are to be displayed in an enlarged manner. More specifically, in response to the line of sight 9B of avatar object 6B being directed at the avatar object 6A (i.e., when user 5B is looking at user 5A), the virtual hands of the avatar object 6B are displayed in an enlarged manner on the field-of-view V. Therefore, in response to anticipation that communication between the avatar object 6A and the avatar object 6B is to be performed, the virtual hands of the avatar object 6B can be displayed in an enlarged manner on the field-of-view image V.

The determination condition defined in Step S1636 is provided as one of the conditions for determining whether the virtual hands of the avatar object 6B are to be displayed in an enlarged manner. More specifically, in response to the line of sight 9A of avatar object 6A being directed at the avatar object 6B (i.e., when user 5A is looking at user 5B), the virtual hands of the avatar object 6B are displayed in an enlarged manner on the field-of-view image. Therefore, in response to an anticipation that communication between the avatar object 6A and the avatar object 6B is to be performed, the virtual hands of the avatar object 6B can be displayed in an enlarged manner on the field-of-view image.

The determination condition defined in Step S1638 is provided as one of the conditions for determining whether the virtual hands of the avatar object 6B are to be displayed in an enlarged manner. More specifically, in response to the position y1 of the virtual left hand 8B of the avatar object 6B in the y-axis direction of the virtual space 11A being present within a predetermined range, the virtual left hand 8B is displayed in an enlarged manner on the field-of-view image. Similarly, in response to the position y2 of the virtual right hand 7B of the avatar object 6B in the y-axis direction of the virtual space 11A being present within a predetermined range, the virtual right hand 7B is enlarged and displayed on the field-of-view image. In this way, in response to the avatar object 6B signaling the avatar object 6A by using its virtual hands, the virtual hands of the avatar object 6B used for the signaling are displayed in an enlarged manner.

The determination condition defined in Step S1639 is provided as one of the conditions for determining whether the virtual hands of the avatar object 6B are to be displayed in an enlarged manner. More specifically, when a sound (e.g., "Hey") has been uttered from the user 5B, the virtual hands of the avatar object 6B are displayed in an enlarged manner on the field-of-view image. Therefore, in response to anticipation that communication between the avatar object 6A and the avatar object 6B is to be performed, the virtual hands of the avatar object 6B can be displayed in an enlarged manner on the field-of-view image.

In at least one embodiment, in response to all of the determination conditions defined in Steps S1633, S1635, S1636, S1638, and S1639 being satisfied, the virtual hands of the avatar object 6B are displayed in an enlarged manner on the field-of-view image. However, this disclosure is not limited to this arrangement. For example, the determination conditions defined in Steps S1635, S1636, S1638, and S1639 may be omitted, and the enlarged display processing defined in Step S1640 may be executed in response to a determination that the condition defined in Step S1633 is satisfied. In this way, the conditions for determining whether the virtual hands of the avatar object 6B are to be displayed in an enlarged manner may include only the determination condition defined in Step S1633.

The conditions for determining whether the virtual hands of the avatar object 6B are to be displayed in an enlarged manner can include at least one of the determination conditions defined in Steps S1635, S1636, S1638, and S1639 and the determination condition defined in Step S1633. For example, the conditions for determining whether the virtual hands of the avatar object 6B are to be displayed in an enlarged manner may include the determination condition defined in Step S1633 and the determination condition defined in Step S1635.

Figure 20:
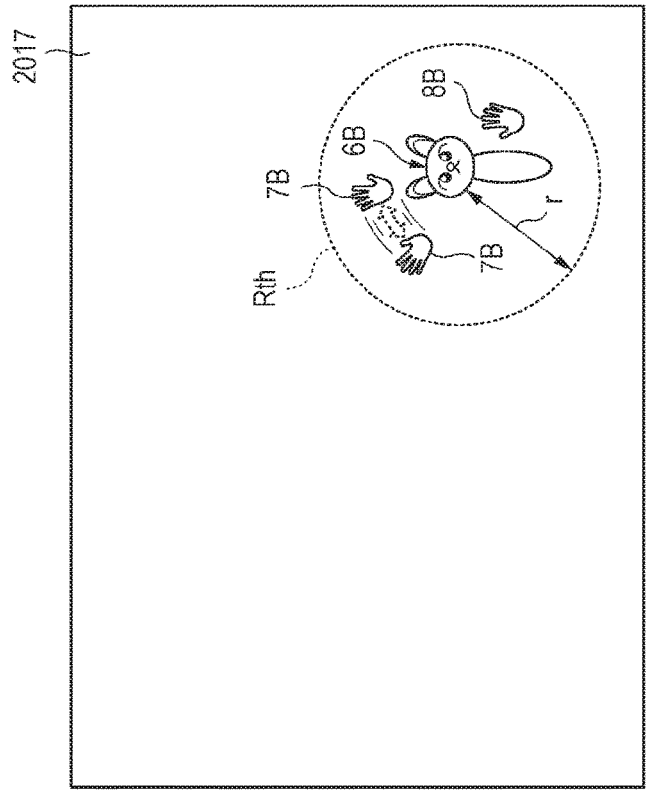
FIG. 20 A diagram of processing for determining whether or not a size of a virtual body of the avatar is smaller than a predetermined size according to at least one embodiment of this disclosure.

In at least one embodiment, the determination condition defined in Step S1633 is executed as a condition relating to the relative positional relationship between the avatar object 6A and the avatar object 6B, but this disclosure is not limited to this arrangement. In this regard, the processor 210 may identify the size of the virtual body of the avatar object 6B on the field-of-view image displayed on the HMD 120 of the HMD set 110A, and then determine whether or not the identified size of the virtual body of the avatar object 6B is smaller than a predetermined size (avatar size determination condition). For example, in FIG. 20, the processor 210 may determine that the size of the virtual body of the avatar object 6B is smaller than the predetermined size when the virtual body of the avatar object 6B displayed on the field-of-view image 2017 fits completely within a predetermined region Rth (region indicated by dotted line) defined by a radius r. In response to a determination that the size of the virtual body of the avatar object 6B is smaller than the predetermined size, a determination is made that the avatar object 6A and the avatar object 6B are present at positions sufficiently separated from each other. On the other hand, in response to the virtual body of the avatar object 6B displayed on the field-of-view image 2017 not fitting completely within the predetermined region Rth, the processor 210 can determine that the size of the virtual body of the avatar object 6B is equal to or larger than the predetermined size. In response to a determination that the size of the virtual body of the avatar object 6B is equal to or larger than the predetermined size, a determination is made that the avatar object 6A and the avatar object 6B are not present at positions sufficiently separated from each other. The processor 210 may also determine, in accordance with a height dimension or a width dimension of the avatar object 6B displayed on the field-of-view image 2017, whether or not the size of the virtual body of the avatar object 6B is smaller than the predetermined size.

The conditions for determining whether the virtual hands of the avatar object 6B are to be displayed in an enlarged manner may include only the above-mentioned avatar size determination condition. The conditions for determining whether the virtual hands of the avatar object 6B are to be displayed in an enlarged manner may also include at least one of the determination conditions defined in Steps S1635, S1636, S1638, and S1639 and the avatar size determination condition.

In at least one embodiment, a determination condition relating to the shape of the virtual hands may be provided instead of or in addition to the determination condition relating to the position of the virtual hands defined in Step S1638. In this regard, the processor 210 may determine whether the shape of the virtual hands of the avatar object 6B is a predetermined shape (e.g., a pointing-finger shape). In this case, in response to a determination that the shape of the virtual hands of the avatar object 6B is a predetermined shape, the processing advances to Step S1639. On the other hand, in response to a determination that the shape of the virtual hands of the avatar object 6B is not the predetermined shape, the processing relating to this information processing method ends.

Figure 21:
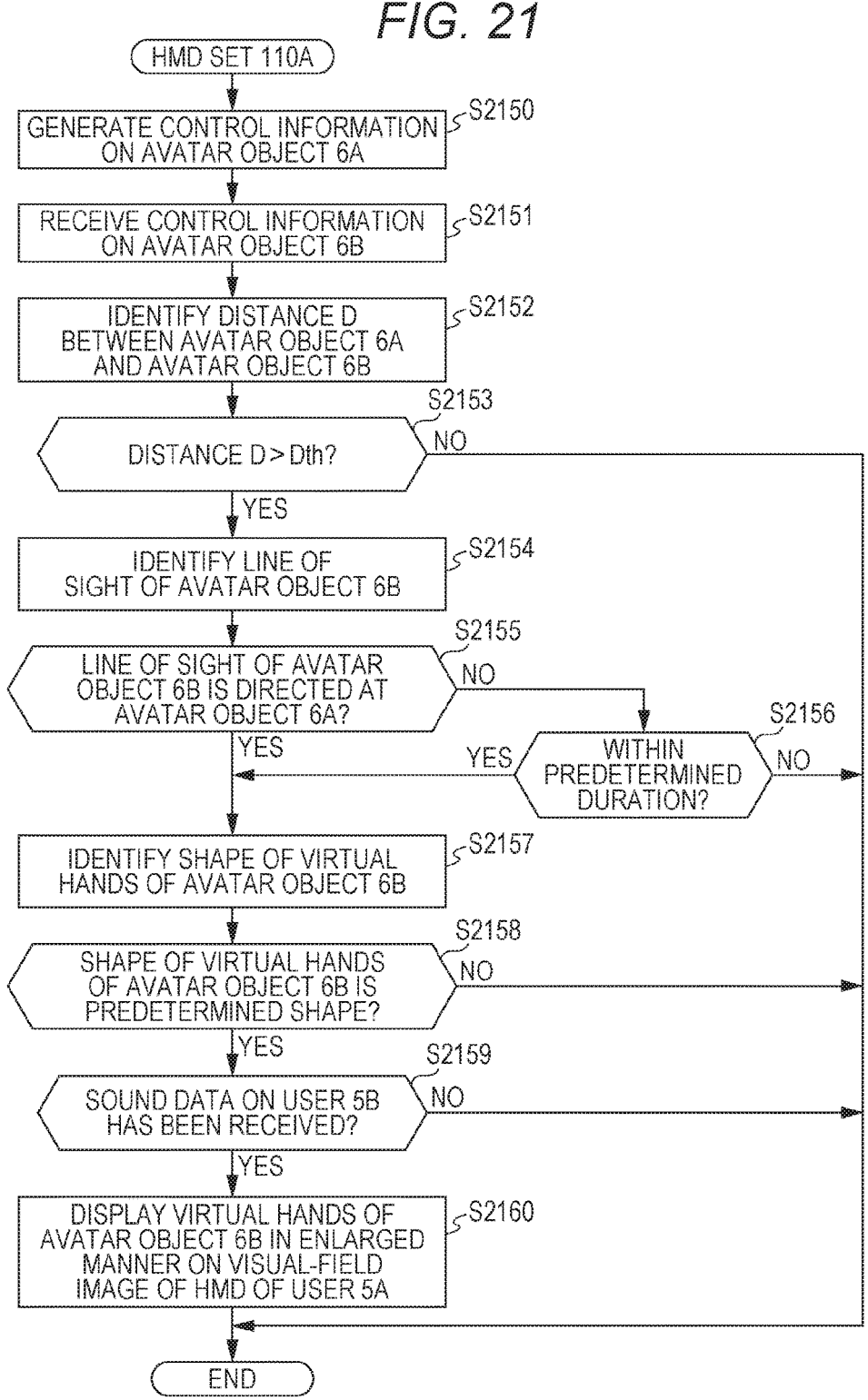
FIG. 21 A flowchart of an information processing method according to at least one embodiment of this disclosure.
Figure 22:
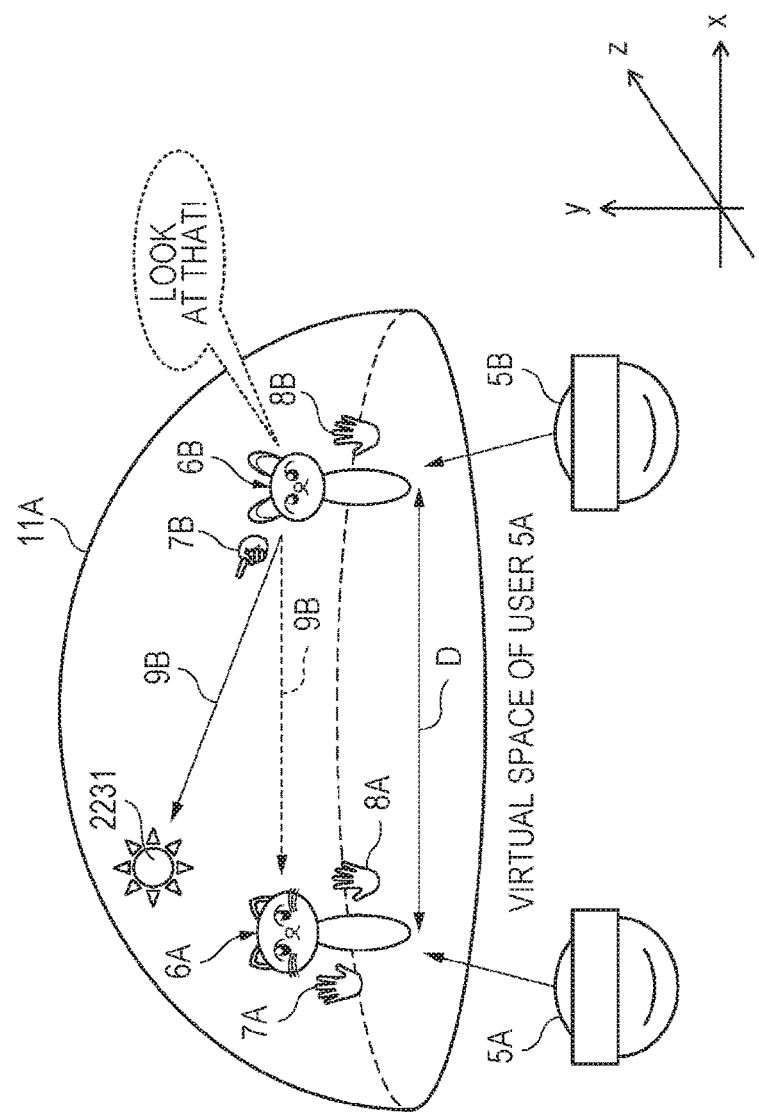
FIG. 22 A diagram of the virtual space provided to the user 5A according to at least one embodiment of this disclosure.
Figure 23:
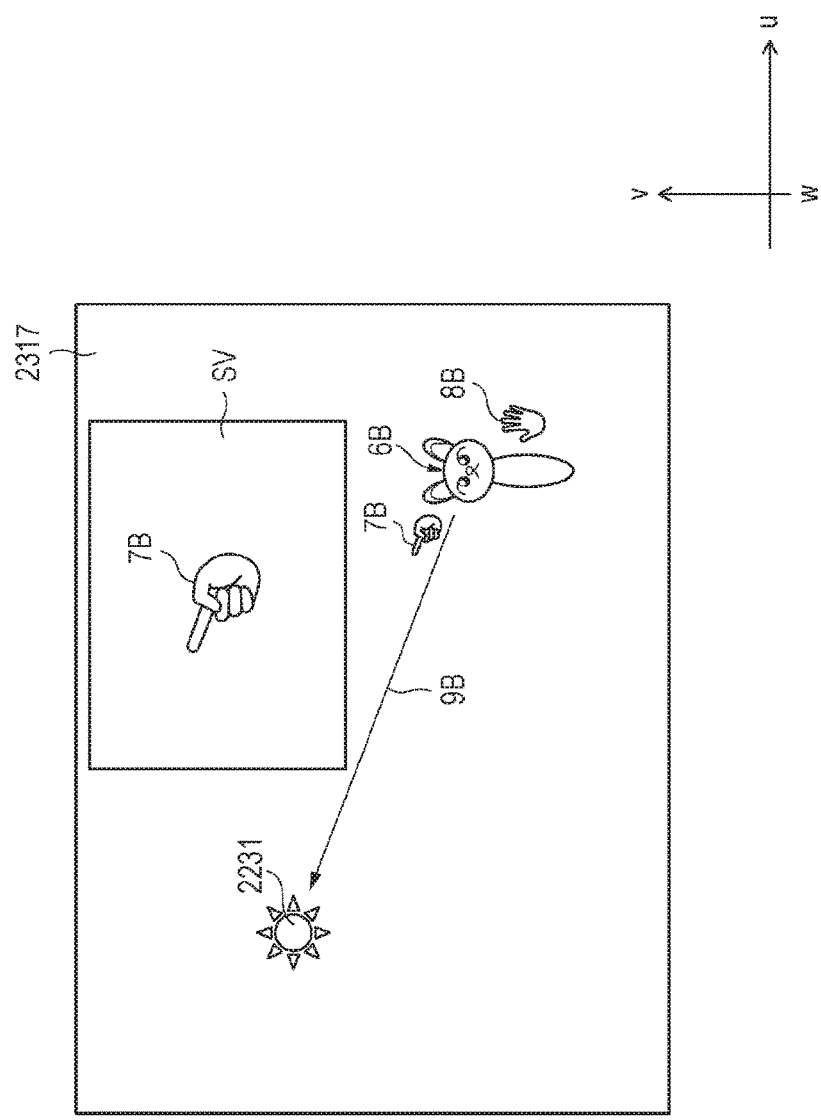
FIG. 23 A diagram of an example of a field-of-view image in which the virtual right hand of the avatar is displayed in an enlarged manner according to at least one embodiment of this disclosure.

Next, an information processing method according to at least one embodiment of this disclosure is described with reference to FIG. 21 to FIG. 23. FIG. 21 is a flowchart of an information processing method according to at least one embodiment of this disclosure. FIG. 22 is a diagram of the virtual space 11A provided to the user 5A according to at least one embodiment of this disclosure. FIG. 23 is a diagram of a field-of-view image 2317 in which the virtual right hand 7B of the avatar object 6B is displayed in an enlarged manner according to at least one embodiment of this disclosure. The information processing method according to FIG. 21 is different from the information processing method according to FIG. 16 in that the processing defined in Steps S2155 to S2158 is provided. In the following description, the matters already described with respect to FIG. 16 are not described again.

In FIG. 21, the processor 210 of the HMD set 110A (hereinafter simply referred to as "processor 210") executes the processing defined in Steps S2150 to S2155. The processing defined in each of Steps S2150 to S2155 is the same as the processing defined in Steps S1630 to S1635 in FIG. 16. Next, in response to a determination by the processor 210 that the line of sight 9B of the avatar object 6B is currently directed at the avatar object 6A (YES in Step S2155), the processing advances to Step S2157. On the other hand, in response to a determination by the processor 210 that the line of sight 9B of the avatar object 6B is not currently directed at the avatar object 6A (NO in Step S2155), the processor 210 determines whether or not the duration for which the line of sight 9B of the avatar object 6A is directed at another object (e.g., sun object 8) is within a predetermined duration T (e.g., within Y seconds) (Step S2156). In response to the determination result of Step S2156 being "NO", the processing relating to this information processing method ends. On the other hand, in response to the determination result of Step S2156 being "YES", the processing advances to Step S2157.

Next, in Step S2157, the processor 210 identifies, based on the information on the virtual hands (virtual left hand 8B and virtual right hand 7B) of the avatar object 6B included in the control information on the avatar object 6B, the shape of the virtual left hand 8B and the virtual right hand 7B. Then, the processor 210 determines whether or not the identified shape of the virtual left hand 8B and the identified shape of the virtual right hand 7B are a predetermined shape (in this example, pointing-finger shape) (Step S2158). In this example, in FIG. 22, the virtual right hand 7B has a pointing-finger shape, and hence the processor 210 determines that the shape of the virtual right hand 7B is a pointing-finger shape (YES in Step S2158). On the other hand, the shape of the virtual left hand 8B is not a pointing-finger shape, and hence the processor 210 determines that the shape of the virtual left hand 8B is not a pointing-finger shape (NO in Step S2158). In particular, the processor 210 may determine that the shape of the virtual hands is not a pointing-finger shape when a thumb of the virtual hands is upright, or when the middle finger, the ring finger, and little finger are extended.

In response to the determination result of Step S2158 being "YES", the processing advances to the processing of Step S2159. On the other hand, in response to the determination result of Step S2158 being "NO", the processing relating to this information processing method ends. The determination condition defined in Step S2158 is a condition relating to the virtual hands of the avatar object 6B. In at least one embodiment, only the virtual right hand 7B satisfies the determination condition defined in Step S1638, and hence the processing defined in Step S2160 is executed only for the virtual right hand 7B.

Then, the processor 210 executes the processing defined in Steps S2159 and S2160. The processing defined in Steps S2159 and S2160 is the same as the processing defined in Steps S1639 and S1640 in FIG. 16.

In particular, when the user 5B utters "Look at that!" through the microphone 170 of the HMD set 110B in Step S2159, sound data representing the sound "Look at that!" of the user 5B is transmitted from the HMD set 110B to the server 600.

In Step S2160, the processor 210 displays the virtual right hand 7B of the avatar object 6B in an enlarged manner on the field-of-view image V displayed on the HMD 120 of the HMD set 110A. In other words, in response to a determination by the processor 210 that all the determination conditions of Steps S2153, (S2155 or S2156), S2158, and S2159 illustrated in FIG. 21 are satisfied, the virtual right hand 7B of the avatar object 6B is displayed in an enlarged manner on the field-of-view image 2317.

In this example, only the virtual right hand 7B satisfies the determination condition defined in Step S2158, and hence only the virtual right hand 7B is displayed in an enlarged manner on the field-of-view image 2317. On the other hand, when both the virtual right hand 7B and the virtual left hand 8B satisfy the determination condition defined in Step S2158, both the virtual left hand 8B and the virtual right hand 7B may be displayed in an enlarged manner on the field-of-view image 2317. In FIG. 23, the processor 210 displays in the sub-image region SV the virtual right hand 7B displayed in an enlarged manner. The virtual right hand 7B displayed in an enlarged manner may also be photographed by an auxiliary virtual camera arranged near the virtual right hand 7B of the avatar object 6B.

The processor 210 may update the avatar object 6B such that the virtual right hand 7B of the avatar object 6B is enlarged, and then display on the HMD 120 of the HMD set 110A the field-of-view image 2317 displaying the updated avatar object 6B.

In at least one embodiment, in response to all of the determination conditions defined in Steps S2153, S2155, S2158, and S2159 being satisfied, the virtual hands (in particular, virtual right hand 7B) of the avatar object 6B are displayed in an enlarged manner on the field-of-view image displayed on the HMD 120 of the HMD set 110A. Even when the determination condition defined in Step S2155 is not satisfied, in response to all of the determination conditions defined in Steps S2153, S2156, S2158, and S2159 being satisfied, the virtual hands (in particular, virtual right hand 7B) of the avatar object 6B are displayed in an enlarged manner on the field-of-view image. In this way, the user 5A is able to clearly visually recognize the motion (e.g., pointing-finger motion) by the virtual right hand 7B of the avatar object 6B by looking at the virtual right hand 7B of the avatar object 6B displayed in an enlarged manner on the field-of-view image. As a result, smooth communication in which body language is used between the avatar object 6A (user 5A) and the avatar object 6B (user 5B) can be achieved. In particular, when the avatar object 6B utters "Look at that!" and points at a sun object 2231, the user 5A is able to easily understand the intention of the avatar object 6B (user 5B), namely, that the user 5B wants the avatar object 6A (user 5A) to look at the sun object 2231, by visually recognizing the pointing-finger shape of the virtual right hand 7B. Therefore, a rich virtual experience can be provided to the user.

In at least one embodiment, the determination condition defined in Step S2156 is provided as one of the conditions for determining whether the virtual hands of the avatar object 6B are to be displayed in an enlarged manner. More specifically, in response to the duration for which the line of sight 9B of the second avatar 6B being directed from the first avatar 6A at another object is within the predetermined duration T, the virtual hands of the avatar object 6B are displayed in an enlarged manner on the field-of-view image. Therefore, in response to anticipation that communication between the avatar object 6A and the avatar object 6B is to continue, the virtual hands of the avatar object 6B are displayed in an enlarged manner on the field-of-view image.

The determination condition defined in Step S2158 is provided as one of the conditions for determining whether the virtual hands of the avatar object 6B are to be displayed in an enlarged manner. More specifically, when the virtual left hand 8B has the predetermined shape (pointing-finger shape), the virtual left hand 8B is displayed in an enlarged manner on the field-of-view image, and when the virtual right hand 7B has the predetermined shape (pointing-finger shape), the virtual right hand 7B is displayed in an enlarged manner on the field-of-view image. In this way, when the avatar object 6B is signaling the avatar object 6A by using its virtual hands, the virtual hands of the avatar object 6B used for the signaling are displayed in an enlarged manner.

In at least one embodiment, in response to all of the determination conditions defined in Steps S2153, (S2155 or S2156), S2158, and S2159 being satisfied, the virtual hands of the avatar object 6B are displayed in an enlarged manner on the field-of-view image, but the second embodiment is not limited to this. For example, the determination conditions defined in S2155, S2156, S2158, and S2159 may be omitted, and the enlarged display processing defined in Step S2160 may be executed in response to only the determination condition defined in Step S2153 being satisfied. In this way, the conditions for determining whether the virtual hands of the avatar object 6B are to be displayed in an enlarged manner may include only the determination condition defined in Step S2153.

The conditions for determining whether the virtual hands of the avatar object 6B are to be displayed in an enlarged manner may include at least one of the determination conditions defined in Steps S2155, S2156, S2158, and S2159 and the determination condition defined in Step S2153. For example, the condition determining whether the virtual hands of the avatar object 6B are to be displayed in an enlarged manner may include the determination condition defined in Step S2153 and the determination condition defined in Steps S2155 and S2156.

In at least one embodiment, in response to the shape of the virtual hands of the avatar object 6B being a pointing-finger shape, the virtual hands of the avatar object 6B are displayed in an enlarged manner, but this disclosure is not limited to this arrangement. For example, the virtual hands of the avatar object 6B may be displayed in an enlarged manner in response to the shape of the virtual hands of the avatar object 6B being a predetermined shape other than a pointing-finger shape.

In at least one embodiment, the virtual space data representing the virtual space 11A is updated on the HMD set 110A side, but the virtual space data may be updated on the server 600 side. Further, in at least one embodiment, the field-of-view image data corresponding to the field-of-view image is updated on the HMD set 110A side, but the field-of-view image data may be updated on the server 600 side. In this case, the HMD set 110A displays the field-of-view image on the HMD 120 based on the field-of-view image data transmitted from the server 600.

In at least one embodiment, the processing in each of FIG. 16 and FIG. 21 is executed on the HMD set 110A side, but a part or the processing in FIG. 16 and FIG. 21 may be executed on the server 600 side. More specifically, the processing in FIG. 16 and FIG. 21 may be executed only on the HMD set 110A side (or only on the server 600 side), or may be executed by the HMD set 110A and the server 600 in cooperation.

The order of the processing defined in the respective Steps in FIG. 16 and FIG. 21 is merely an example, and the order of those steps may be changed as appropriate.

In at least one embodiment, the avatar object 6B is operated by the user 5B (i.e., a social VR between the users 5A and 5B is assumed), but the avatar object 6B may be controlled by the processor 610 (artificial intelligence program) of the server 600. In this case, the sound content of the avatar object 6B may be determined by the control unit 23.

In at least one embodiment, the movement of the virtual hands of the avatar is controlled in accordance with the motion by the external controller 300 representing the motion by the hands of the user 5, but the movement of the virtual hands of the avatar may be controlled in accordance with a movement amount of the hands of the user 5 themselves. For example, in place of using an external controller, by using a glove type device or a ring type device worn on the fingers of the user, the position and movement amount of the hands of the user 5 can be detected by the motion sensor 420, and the motion and the state of the fingers of the user 5 can be detected. The motion sensor 420 may be a camera configured to photograph the hand (including the fingers) of the user 5. In this case, by imagine of the hands of the user by using the camera, the position and the movement amount of the hands of the user 5 can be detected and the motion and the state of the fingers of the user 5 can be detected based on an image in which the hands of the user are displayed without the user wearing some kind of device directly on the fingers of the user.

In at least one embodiment, virtual hands are displayed in an enlarged manner as a part of the virtual body of the avatar, but the second embodiment is not limited to this. For example, other than virtual hands, virtual legs or a virtual face, which are parts of the virtual body of the avatars, may be displayed in an enlarged manner.

In order to achieve various types of processing to be executed by the processor 210 of the HMD set 110 with use of software, a control program for executing various types of processing on a computer (processor) may be installed in advance into the storage 230 or the memory 220. Alternatively, the control program may be stored in a computer-readable storage medium, for example, a magnetic disk (HDD or floppy disk), an optical disc (for example, CD-ROM, DVD-ROM, or Blu-ray disc), a magneto-optical disk (for example, MO), and a flash memory (for example, SD card, USB memory, or SSD). In this case, the storage medium is connected to the computer 200, and thus the control program stored in the storage medium is installed into the storage 230. Then, the control program installed in the storage 230 is loaded onto the RAM, and the processor executes the loaded program. In this manner, the processor 210 executes the various types of processing.

The control program may be downloaded from a computer on the communication network 2 via the communication interface 250. Also in this case, the downloaded program is similarly installed into the storage 230.

The description of the above described embodiments is not to be read as a restrictive interpretation of the technical scope of this disclosure. The embodiments are merely given as examples, and would be understood by a person skilled in the art that various modifications can be made to the embodiments within the scope of this disclosure set forth in the appended claims. Thus, the technical scope of this disclosure is to be defined based on the scope of this disclosure set forth in the appended claims and an equivalent scope thereof.

In the at least one embodiment described above, the description is given by exemplifying the virtual space (VR space) in which the user is immersed using an HMD. However, a see-through HMD may be adopted as the HMD. In this case, the user may be provided with a virtual experience in an augmented reality (AR) space or a mixed reality (MR) space through output of a field-of-view image that is a combination of the real space visually recognized by the user via the see-through HMD and a part of an image forming the virtual space. In this case, action may be exerted on a target object in the virtual space based on motion of a real hand of the user instead of the operation object. Specifically, the processor may identify coordinate information on the position of the hand of the user in the real space, and define the position of the target object in the virtual space in connection with the coordinate information in the real space. With this, the processor can grasp the positional relationship between the hand of the user in the real space and the target object in the virtual space, and execute processing corresponding to, for example, the above-mentioned collision control between the hand of the user and the target object. As a result, an action is exerted on the target object based on motion of the real hand of the user.

What is claimed is:

1. A method, comprising:
defining a virtual space,
wherein the virtual space comprises a second avatar object and a first avatar object, the first avatar object is associated with a first user, and
wherein the first user is associated with a first head-mounted device (HMD);
identifying a position of the first avatar object in the virtual space;
defining a visual field from the position in the virtual space;
generating a visual-field image corresponding to the visual field;
displaying the visual-field image on the HMD;
identifying a relative positional relationship between the first avatar object and the second avatar object; and
enlarging at least a part of the second avatar object in response to the relative positional relationship satisfying a predetermined condition, wherein the enlarging comprises maintaining the relative positional relationship between the first avatar object and the second avatar object.

2. The method according to claim 1,
wherein the relative positional relationship comprises a distance between the first avatar object and the second avatar object, and
wherein the enlarging of the at least a part of the second avatar object comprises enlarging the at least a part of the second avatar object in response to the distance being larger than a predetermined distance.

3. The method according to claim 1,
wherein the identifying of the relative positional relationship comprises identifying the relative positional relationship based on a size of the second avatar object displayed on the visual-field image, and
wherein the enlarging of the at least a part of the second avatar object comprises enlarging the at least a part of the second avatar object in response to the size being smaller than a predetermined size.

4. The method according to claim 1, further comprising identifying a line of sight of the second avatar object,
wherein the identifying of the relative positional relationship comprises identifying the relative positional relationship based on the line of sight of the second avatar object.

5. The method according to claim 4, wherein the enlarging of the at least a part of the second avatar object comprises enlarging the at least a part of the second avatar object in response to the line of sight of the second avatar object being directed at the first avatar object.

6. The method according to claim 5, further comprising identifying a duration for which the line of sight of the second avatar object is directed at the first avatar object,
wherein the enlarging of the at least a part of the second avatar object comprises enlarging the at least a part of the second avatar object in response to the duration being directed at the first avatar object for longer than a predetermined duration.

7. The method according to claim 4, further comprising:
detecting that the line of sight of the second avatar object is directed at the first avatar object;
subsequently detecting that the line of sight of the second avatar object is not directed at the first avatar object; and
identifying an elapsed time from the point at which the line of sight of the second avatar object is no longer directed at the first avatar object,
wherein the enlarging of the at least a part of the second avatar object comprises enlarging the at least a part of the second avatar object in response to the elapsed time being within a predetermined duration.

8. The method according to claim 1, further comprising identifying a line of sight of the first avatar object,
wherein the identifying of the relative positional relationship comprises identifying the relative positional relationship based on the line of sight of the first avatar object.

9. The information processing method according to claim 1, further comprising acquiring information on a portion of the second avatar object,
wherein the identifying of the relative positional relationship comprises identifying the relative positional relationship based on the portion.

10. The method according to claim 9, further comprising identifying a position of the portion in a height direction in the virtual space,
wherein the enlarging of the at least a part of the second avatar object comprises enlarging the at least a part of the second avatar object in response to the position of the portion being included within a predetermined range in the height direction.

11. The method according to claim 9, further comprising determining a shape of the portion,
wherein the enlarging of the at least a part of the second avatar object comprises enlarging the at least a part of the second avatar object in response to the shape of the portion being a predetermined shape.

12. The method according to claim 1, further comprising acquiring sound data representing a sound relating to the second avatar object,
wherein the enlarging of the at least a part of the second avatar object comprises enlarging the at least a part of the second avatar object in response to the relative positional relationship satisfying a predetermined condition and the sound data having been acquired.

* * * * *